US012531926B2

United States Patent
Unagami et al.

(10) Patent No.: US 12,531,926 B2
(45) Date of Patent: Jan. 20, 2026

(54) DATA DISTRIBUTION METHOD, RECORDING MEDIUM, AND DATA DISTRIBUTION SYSTEM

(71) Applicant: Panasonic Intellectual Property Corporation of America, Torrance, CA (US)

(72) Inventors: Yuji Unagami, Osaka (JP); Hideki Matsushima, Tokyo (JP); Tomoyuki Haga, Nara (JP); Manabu Maeda, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 43 days.

(21) Appl. No.: 18/802,033

(22) Filed: Aug. 13, 2024

(65) Prior Publication Data

US 2024/0406259 A1    Dec. 5, 2024

Related U.S. Application Data

(63) Continuation of application No. 17/843,408, filed on Jun. 17, 2022, now Pat. No. 12,088,664, which is a
(Continued)

(51) Int. Cl.
*H04L 67/1087*     (2022.01)
*H04L 9/00*     (2022.01)
*H04L 9/40*     (2022.01)

(52) U.S. Cl.
CPC ............ *H04L 67/1091* (2013.01); *H04L 9/50* (2022.05); *H04L 63/0807* (2013.01)

(58) Field of Classification Search
CPC ....... H04L 67/1091; H04L 9/50; H04L 63/04; H04L 67/10
See application file for complete search history.

(56) References Cited

U.S. PATENT DOCUMENTS 10,417,219 B1    9/2019  Yang et al.
10,833,843 B1 *  11/2020  Vijayvergia .......... H04L 9/3242
(Continued)

FOREIGN PATENT DOCUMENTS

JP    2003-256738    9/2003
JP    2016-91067    5/2016
(Continued)

OTHER PUBLICATIONS

International Search Report (ISR) issued on Mar. 16, 2021 in International (PCT) Application No. PCT/JP2020/047681.
(Continued)

*Primary Examiner* — Caroline H Jahnige
(74) *Attorney, Agent, or Firm* — Wenderoth, Lind & Ponack, L.L.P.

(57) ABSTRACT

In a data distribution method according to the disclosure, first authentication servers and a first data server belong to a first group, and second authentication servers and a second data server belong to a second group different from the first group. A first authentication server obtains first transaction data that includes a data obtaining request indicating a request for obtaining or referring to data pertaining to an apparatus, and records a block including the first transaction data into its distributed ledger belonging to the first group. A second authentication server obtains the first transaction data, and records the block including the first transaction data into a distributed ledger belonging to the second group. The first authentication server causes the first data server to transfer the data pertaining to the apparatus held therein to the second data server or to make such data available for reference by the second data server.

10 Claims, 20 Drawing Sheets

Related U.S. Application Data continuation of application No. PCT/JP2020/047681, filed on Dec. 21, 2020.

(60) Provisional application No. 62/953,761, filed on Dec. 26, 2019.

(56) References Cited

U.S. PATENT DOCUMENTS

| | | | |
|---|---|---|---|
| 2019/0272291 A1* | 9/2019 | Imai | H04L 9/0643 |
| 2020/0126050 A1 | 4/2020 | Savolainen | |
| 2021/0120083 A1* | 4/2021 | Kwun | H04L 67/10 |

FOREIGN PATENT DOCUMENTS

| | | |
|---|---|---|
| JP | 6543743 | 7/2019 |
| JP | 2019-153181 | 9/2019 |
| JP | 2019-176458 | 10/2019 |

OTHER PUBLICATIONS

Keidanren, "Strategy for Promoting Data Utilization to Realize Society 5.0", Internet (URL: https://www.keidanren.or.jp/en/policy/2017/104.html?v=p), Dec. 12, 2017 [search on Dec. 25, 2019].

Shinsaku Kiyomoto, "Distributed Blockchain Architecture and Its Application to Data Distribution Platform", The 38th Joint Conference on Medical Informatics (JCMI), Nov. 2018 (with English translation).

* cited by examiner

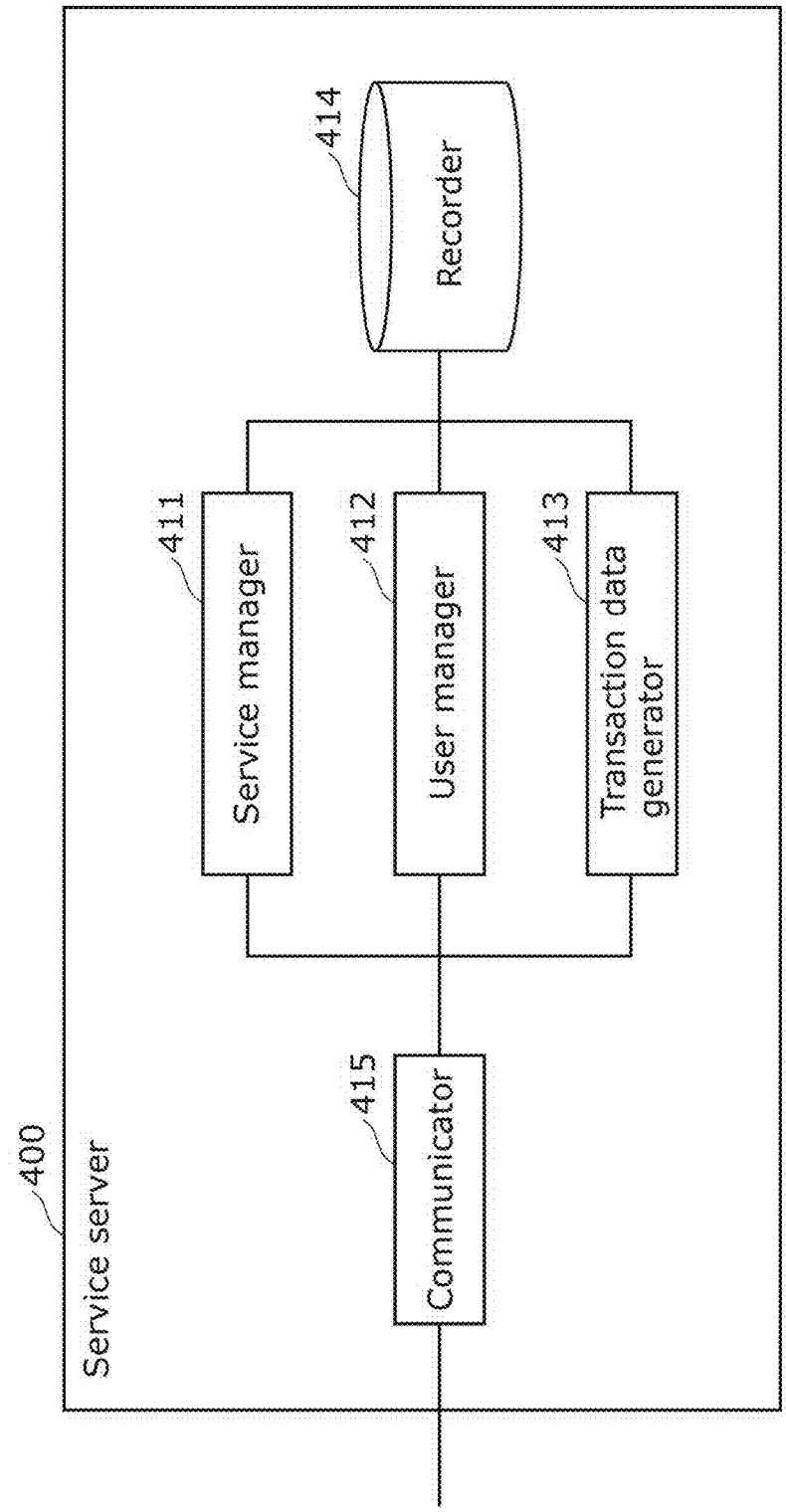

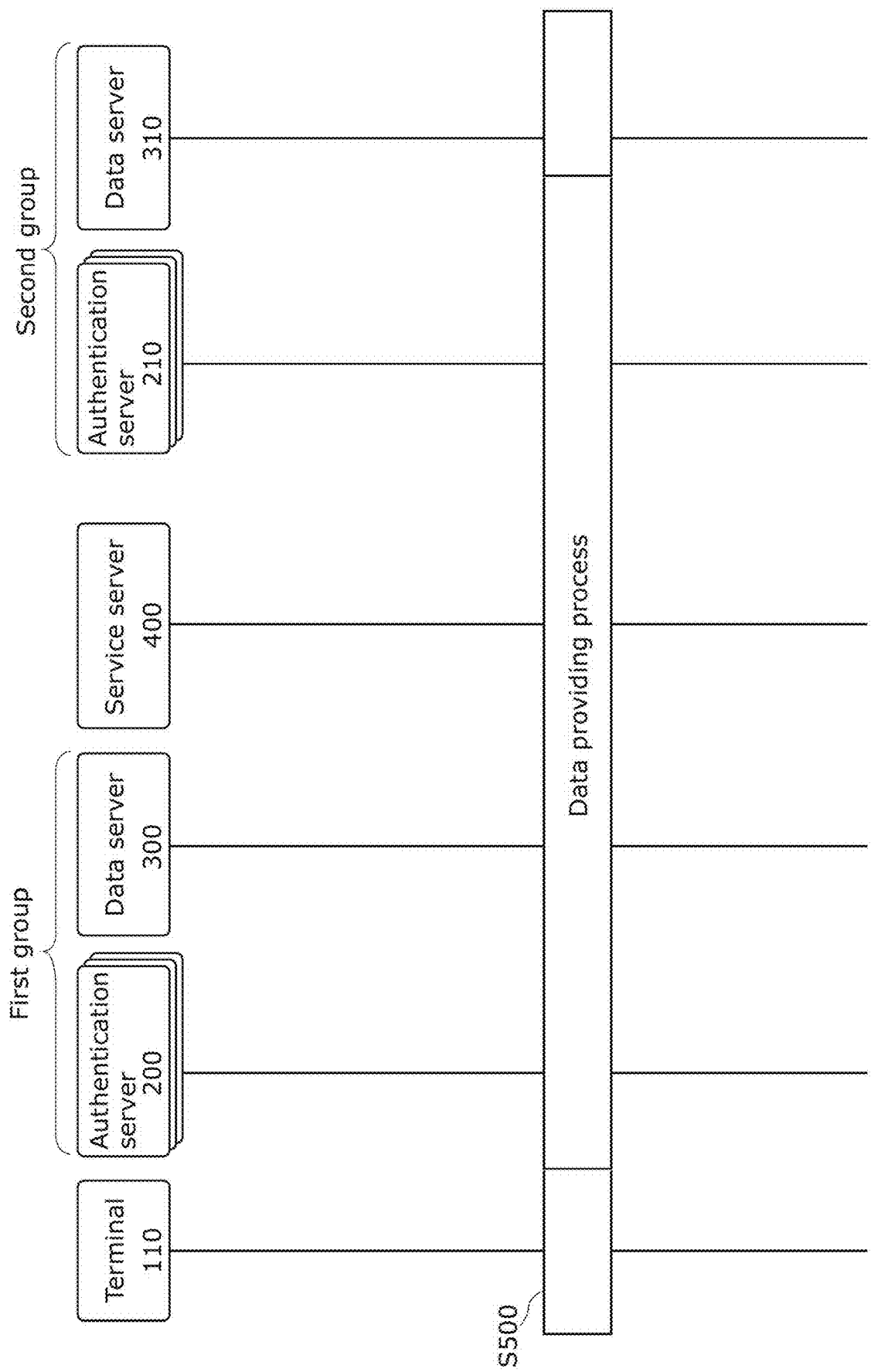

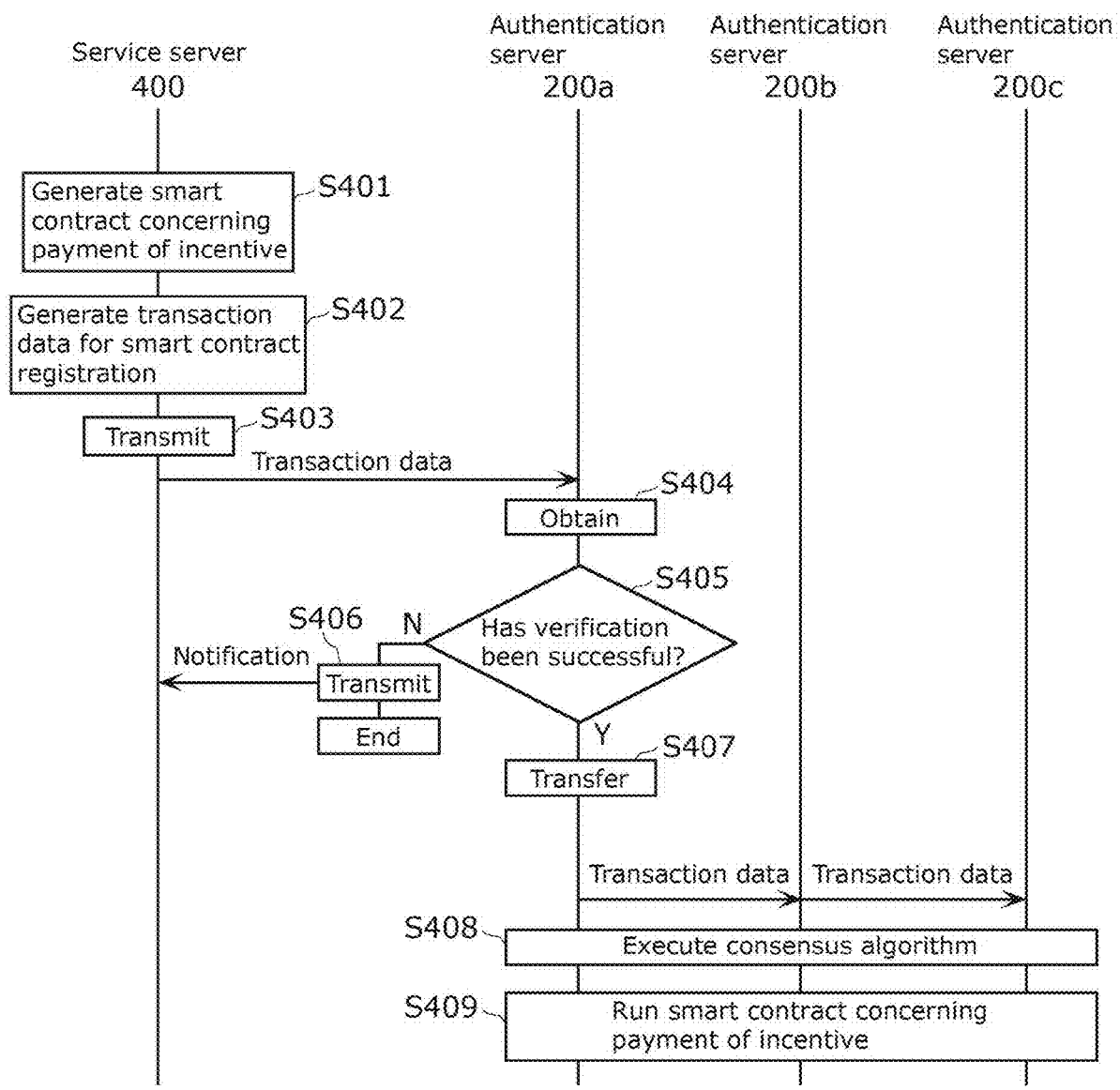

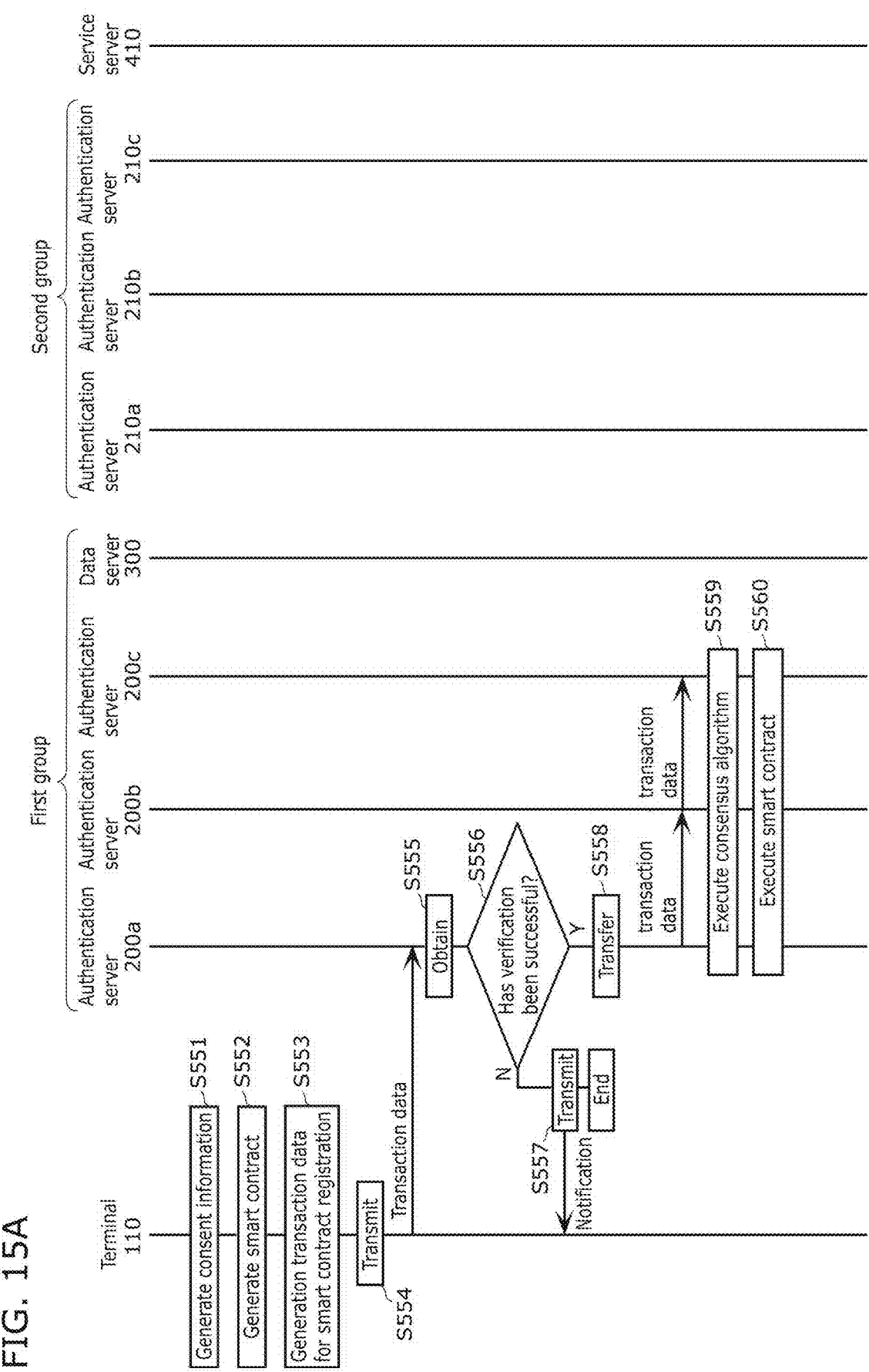

DATA DISTRIBUTION METHOD, RECORDING MEDIUM, AND DATA DISTRIBUTION SYSTEM

CROSS REFERENCE TO RELATED APPLICATIONS

This application is a continuation of U.S. application Ser. No. 17/843,408 filed on Jun. 17, 2022, which is a continuation application of PCT International Application No. PCT/JP2020/047681 filed on Dec. 21, 2020, designating the United States of America, which is based on and claims priority of U.S. Provisional Patent Application No. 62/953,761 filed on Dec. 26, 2019. The entire disclosures of the above-identified applications, including the specifications, drawings and claims are incorporated herein by reference in their entirety.

FIELD

The present disclosure relates to a data distribution method, a recording medium, and a data distribution system for utilizing data collected from a user.

BACKGROUND

In recent years, systems are considered that collect, analyze, and distribute data pertaining to users and data pertaining to apparatuses. Henceforth, with the advance of Internet of Things (IoT) and with an increased use of artificial intelligence (AI), a larger amount of data can be collected than before, and the utilization of collected data is expected.

For example, Non Patent Literature (NPL) 1 discloses Society 5.0, a human-centered society, where economic advancement and the resolution of social problems are achieved through a system that highly integrates the cyberspace (the virtual space) and the physical space (the real space).

According to NPL 1, in Society 5.0, personal data will be collected, analyzed, distributed, and utilized in the field of, for example, tourism or healthcare.

CITATION LIST

Non Patent Literature

NPL 1: Strategy for Promoting Data Utilization to Realize Society Internet <URL: 5.0, https://www.keidanren.or.jp/en/policy/2017/104.html?v=p>, retrieved Dec. 25, 2019.

SUMMARY

Technical Problem

Despite the above, if a user is unsure about how and where data collected from the user is used, that is, if traceability of data collected from a user cannot be ensured, the user may refrain from providing data, fearing a data leak. Such an issue makes it impossible to collect data sufficient for data utilization.

The present disclosure has been made in view of such circumstances and is directed to providing a data distribution method and so on that enable data utilization while ensuring data traceability.

Solution to Problem

In addressing the above, a data distribution method according to the present disclosure is a data distribution method in a data distribution system that includes a plurality of authentication servers, a plurality of data servers, and an apparatus, and the plurality of authentication servers each include a distributed ledger. The plurality of authentication servers include a plurality of first authentication servers belonging to a first group, and the plurality of data servers include one or more first data servers belonging to the first group. The plurality of authentication servers include a plurality of second authentication servers different from the plurality of first authentication servers and belonging to a second group different from the first group, and the plurality of data servers include one or more second data servers different from the one or more first data servers and belonging to the second group. The data distribution method includes: obtaining, by one first authentication server among the plurality of first authentication servers, first transaction data that includes a data obtaining request indicating a request for obtaining or referring to data pertaining to the apparatus; recording, by the one first authentication server, a block including the first transaction data into the distributed ledger of the one first authentication server belonging to the first group; causing the one or more first data servers to transfer the data pertaining to the apparatus held in the one or more first data servers to the one or more second data servers or to make the data pertaining to the apparatus held in the one or more first data servers available for reference by the one or more second data servers; obtaining, by one second authentication server among the plurality of second authentication servers, the first transaction data; and recording, by the one second authentication server, the block including the first transaction data into the distributed ledger of the one second authentication server belonging to the second group.

It is to be noted that general or specific aspects of the above may be implemented in the form of a system, a method, an integrated circuit, a computer program, or a computer readable recording medium, such as a CD-ROM, or through any desired combination of a system, a method, an integrated circuit, a computer program, and a recording medium.

Advantageous Effects

The present disclosure can provide a data distribution method and so on that enable data utilization while ensuring data traceability.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8 is a block diagram illustrating an example of a service server according to one embodiment.

FIG. 9B is an overall sequence diagram of a data distribution system according to one embodiment.

FIG. 13 is a sequence diagram illustrating a smart contract registration process concerning payment of an incentive performed between authentication servers and a service server according to one embodiment.

FIG. 15A is a sequence diagram illustrating another example of a data providing process performed by a data distribution system according to one embodiment.

DESCRIPTION OF EMBODIMENTS

Description of Embodiments

Figure 1:
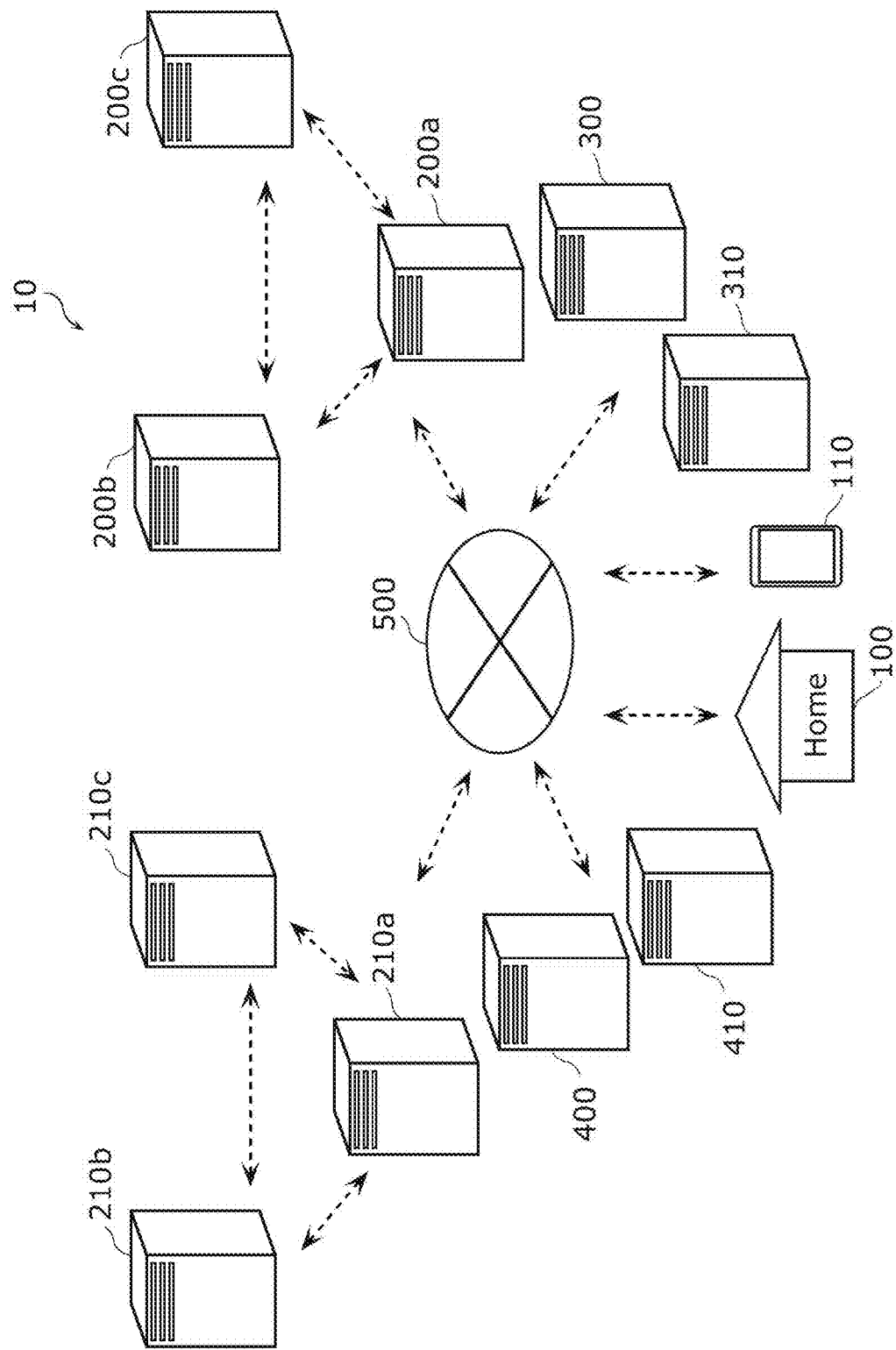
FIG. 1 is a diagram illustrating an example of an overall configuration of a data distribution system according to one embodiment.

A data distribution method according to one embodiment of the present disclosure is a data distribution method in a data distribution system that includes a plurality of authentication servers, a plurality of data servers, and an apparatus, and the plurality of authentication servers each include a distributed ledger. The plurality of authentication servers include a plurality of first authentication servers belonging to a first group, and the plurality of data servers include one or more first data servers belonging to the first group. The plurality of authentication servers include a plurality of second authentication servers different from the plurality of first authentication servers and belonging to a second group different from the first group, and the plurality of data servers include one or more second data servers different from the one or more first data servers and belonging to the second group. The data distribution method includes: obtaining, by one first authentication server among the plurality of first authentication servers, first transaction data that includes a data obtaining request indicating a request for obtaining or referring to data pertaining to the apparatus; recording, by the one first authentication server, a block including the first transaction data into the distributed ledger of the one first authentication server belonging to the first group; causing the one or more first data servers to transfer the data pertaining to the apparatus held in the one or more first data servers to the one or more second data servers or to make the data pertaining to the apparatus held in the one or more first data servers available for reference by the one or more second data servers; obtaining, by one second authentication server among the plurality of second authentication servers, the first transaction data; and recording, by the one second authentication server, the block including the first transaction data into the distributed ledger of the one second authentication server belonging to the second group.

With this method, the fact that the data has been transferred or made available for reference becomes recorded in each of the distributed ledger belonging to the first group from which the data has been provided and the distributed ledger belonging to the second group to which the data has been provided. In this manner, the method above enables coordination of data belonging to different groups. Accordingly, a data distribution method and so on can be provided that enable data utilization while ensuring data traceability even between different groups.

The data distribution system may further include a service server. In the data distribution method, the service server may generate the first transaction data and transmit the first transaction data to the one first authentication server and the one second authentication server. In response to obtaining the first transaction data, the one first authentication server may determine whether the one or more first data servers are allowed to provide the data to the one or more second data servers, based on consent information obtained from the apparatus and concerning utilization of the data; and cause the one or more first data servers to transfer the data pertaining to the apparatus held in the one or more first data servers to the one or more second data servers or to make the data pertaining to the apparatus held in the one or more first data servers available for reference by the one or more second data servers.

This method makes it possible to utilize data based on the user's consent while ensuring data traceability.

The data distribution method may further include generating, by the service server, second transaction data for issuing a token to the apparatus, in response to confirming that the one or more first data servers have transferred the data pertaining to the apparatus to the one or more second data servers or made the data pertaining to the apparatus available for reference by the one or more second data servers; obtaining, by the one first authentication server, the second transaction data; recording, by the one first authentication server, a block including the second transaction data into the distributed ledger of the one first authentication server belonging to the first group; and causing the one first authentication server to execute a smart contract being programmed to be able to issue the token based on the second transaction data recorded, and causing the smart contract to issue the token to the apparatus.

Moreover, the one first authentication server may obtain a smart contract being programmed to be able to determine, based on the consent information, whether the data is allowed to be provided. In response to obtaining the first transaction data, the one first authentication server may execute the smart contract based on the first transaction data obtained, and when the smart contract determines that the data is allowed to be provided from the one or more first data servers to the one or more second data servers, the one first authentication server may cause the one or more first data servers to transfer the data pertaining to the apparatus held in the one or more first data servers to the one or more second data servers or to make the data pertaining to the apparatus held in the one or more first data servers available for reference by the one or more second data servers.

Moreover, when the one first authentication server makes a record into the distributed ledger, the one first authentication server may do a verification on the first transaction data obtained. In response to confirming legitimacy of the first transaction data through the verification, the one first authentication server may, together with a plurality of first authentication servers among the plurality of first authentication servers excluding the one first authentication server, execute a consensus algorithm for establishing a consensus concerning the legitimacy of the first transaction data. In response to establishing the consensus concerning the legitimacy of the first transaction data through the consensus algorithm, the one first authentication server may record the block including the first transaction data into the distributed ledger of the one first authentication server belonging to the first group.

Moreover, when the one second authentication server makes a record into the distributed ledger, the one second authentication server may do a verification on the first transaction data obtained. In response to confirming legitimacy of the first transaction data through the verification, the one second authentication server may, together with a plurality of second authentication servers among the plurality of second authentication servers excluding the one second authentication server, execute a consensus algorithm for establishing a consensus concerning the legitimacy of the first transaction data. In response to establishing the consensus concerning the legitimacy of the first transaction data through the consensus algorithm, the one second authentication server may record the block including the first transaction data into the distributed ledger of the one second authentication server belonging to the second group.

A data distribution system according to one embodiment of the present disclosure includes a plurality of authentication servers each including a distributed ledger, and a plurality of data servers. The plurality of authentication servers include a plurality of first authentication servers belonging to a first group, and the plurality of data servers include one or more first data servers belonging to the first group. The plurality of authentication servers include a plurality of second authentication servers different from the plurality of first authentication servers and belonging to a second group different from the first group, and the plurality of data servers include one or more second data servers different from the one or more first data servers and belonging to the second group. One first authentication server among the plurality of first authentication servers includes a first communicator, a first recorder, and an executor. The first communicator obtains first transaction data that includes a data obtaining request indicating a request for obtaining or referring to data pertaining to an apparatus. By the first recorder, the one first authentication server records a block including the first transaction data into the distributed ledger of the one first authentication server belonging to the first group. The executor causes the one or more first data servers to transfer the data pertaining to the apparatus held in the one or more first data servers to the one or more second data servers or to make the data pertaining to the apparatus held in the one or more first data servers available for reference by the one or more second data servers. One second authentication server among the plurality of second authentication servers includes a second communicator and a second recorder. The second communicator obtains the first transaction data. By the second recorder, the one second authentication server records the block including the first transaction data into the distributed ledger of the one second authentication server belonging to the second group.

Hereinafter, some embodiments will be described with reference to the drawings. It is to be noted that the embodiments described hereinafter merely illustrate specific examples of the present disclosure. Accordingly, the numerical values, the shapes, the materials, the constituent elements, the arrangements and the connection modes of the constituent elements, the steps, the order of the steps, and so on illustrated in the following embodiments are examples according to the present disclosure and are not intended to limit the present disclosure. Among the constituent elements described in the following embodiments, any constituent element that is not described in an independent claim describing a mode of implementation according to one embodiment of the present disclosure is to be construed as an optional constituent element. The modes for implementation according to the present disclosure are not limited to the current independent claims and may also be expressed by other independent claims.

EMBODIMENT

First, a system configuration according to the present disclosure will be described.

1. System Configuration

A data distribution system according to the present disclosure records the fact that data has been transferred or made available for reference into each of a distributed ledger belonging to a group from which the data has been provided and a distributed ledger belonging to another group to which the data has been provided. With this configuration, the data distribution system according to the present disclosure enables coordination of data belonging to different groups while ensuring data traceability by use of a blockchain technology. In other words, the data distribution system according to the present disclosure allows for utilization of data while ensuring the traceability of such data. Accordingly, a user can provide his or her data trustingly.

Hereinafter, the data distribution system and so on according to the embodiment will be described with reference to the drawings.

1.1 Overall Configuration of Data Distribution System 10

FIG. 1 is a diagram illustrating an example of an overall configuration of data distribution system 10 according to the present embodiment. As illustrated in FIG. 1, data distribution system 10 includes home 100, terminal 110, authentication servers 200a, 200b, 200c, 210a, 210b, and 210c, data servers 300 and 310, and service servers 400 and 410. These components are connected to each other via communication network 500.

Authentication servers 200a, 200b, 200c, 210a, 210b, and 210c each connect to a storage device having a distributed ledger that electronically records therein transaction data and a block of a blockchain. In this example, each authentication server 200 may be connected to such a storage device via communication network 500 or may include such a storage device within authentication server 200.

Authentication servers 200a, 200b, and 200c and data server 300 form a group (hereinafter, referred to as a first group). In the description below, authentication servers 200a, 200b, and 200c manage data in data server 300 by use of a blockchain technology. Authentication servers 200a, 200b, and 200c may each or collectively be referred to below as authentication server 200. In a similar manner, authentication servers 210a, 210b, and 210c and data server 310 form another group (hereinafter, referred to as a second group) different from the first group. In the description below, authentication servers 210a, 210b, and 210c manage data in data server 310 by use of a blockchain technology. Authentication servers 210a, 210b, and 210c may each or collectively be referred to below as authentication server 210. In this example, the first group and the second group are each, for example, an example of a different platform of a blockchain, and the distributed ledgers belonging to the first group and the distributed ledgers belonging to the second group include different transaction data.

1.2 Configuration of Home 100

Figure 2:
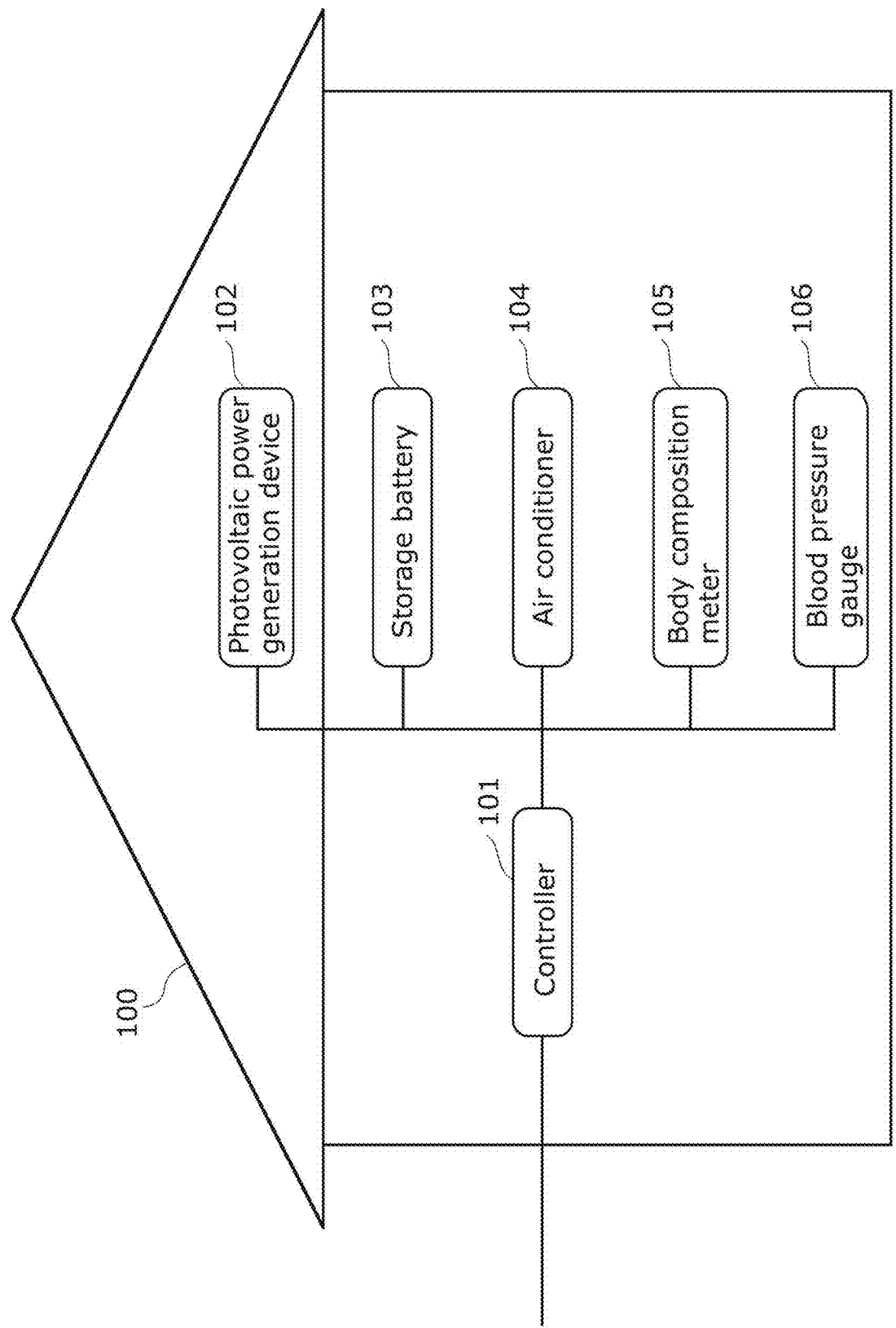
FIG. 2 is a diagram illustrating an example of an overall configuration of a home according to one embodiment.

FIG. 2 is a diagram illustrating an example of an overall configuration of home 100 according to the present embodiment.

Home 100 is an example of an apparatus according to the present disclosure that obtains or collects user data. Data to be obtained or collected may be, for example, a user's healthcare data, such as health screening data, sleep data, blood pressure data, body weight data, or exercise data, but these are not limiting examples. Data to be obtained or collected is not limited to healthcare data and may be a user's personal data including vitals data, such as heartbeat data; measurement data; or history information of an apparatus, such as the performance history of the apparatus or the operation history of the apparatus. In this manner, data to be obtained or collected may be any type of data that a service provider can utilize.

According to the present embodiment, as illustrated in FIG. 2, home 100 includes controller 101, photovoltaic power generation device 102, storage battery 103, air conditioner 104, body composition meter 105, and blood pressure gauge 106. These components are connected to each other via a communication network.

In the following description, data obtained or collected by home 100 is stored into data server 300 belonging to the first group.
<Controller 101>

Controller 101 controls an in-home device, such as air conditioner 104, body composition meter 105, or blood pressure gauge 106. Moreover, controlling block 1011 may display the performance condition of photovoltaic power generation device 102 and storage battery 103.

Moreover, controller 101 may collect history information such as the performance history or the operation history of an in-home device or collect history information on the performance condition of photovoltaic power generation device 102 and storage battery 103. Moreover, controller 101 may collect measurement data measured by an in-home device.

Furthermore, controller 101 may transmit collected data, such as the history information or the measurement data, to data server 300 or may transmit generated transaction data to authentication server 200.
<Photovoltaic Power Generation Device 102>

Photovoltaic power generation device 102 is a device equipped with a power generation scheme where sunlight is directly converted into electric power by use of solar cells. The electric power generated by photovoltaic power generation device 102 is used in home 100 or stored in storage battery 103. In this example, photovoltaic power generation device 102 is not an essential component, and home 100 does not need to include photovoltaic power generation device 102.
<Storage Battery 103>

Storage battery 103 stores electric power generated by photovoltaic power generation device 102. In this example, storage battery 103 is not an essential component, and home 100 does not need to include storage battery 103.
<Air Conditioner 104, Body Composition Meter 105, and Blood Pressure Gauge 106>

Air conditioner 104, body composition meter 105, and blood pressure gauge 106 are in-home devices used by a user. Alternatively, air conditioner 104, body composition meter 105, and blood pressure gauge 106 may each be an example of an apparatus according to the present disclosure. For example, history information such as the performance history or the operation history of air conditioner 104 is transmitted to data server 300. In addition, history information such as the performance history or the operation history of body composition meter 105 and blood pressure gauge 106 as well as a user's measurement data such as the body weight data measured by body composition meter 105 and/or the blood pressure data measured by blood pressure gauge 106 is also transmitted to data server 300. In this example, these items of data may be transmitted to data server 300 via controller 101 or transmitted directly to data server 300.

Now, an example of a configuration of controller 101 will be described.

1.3 Configuration of Controller 101

Figure 3:
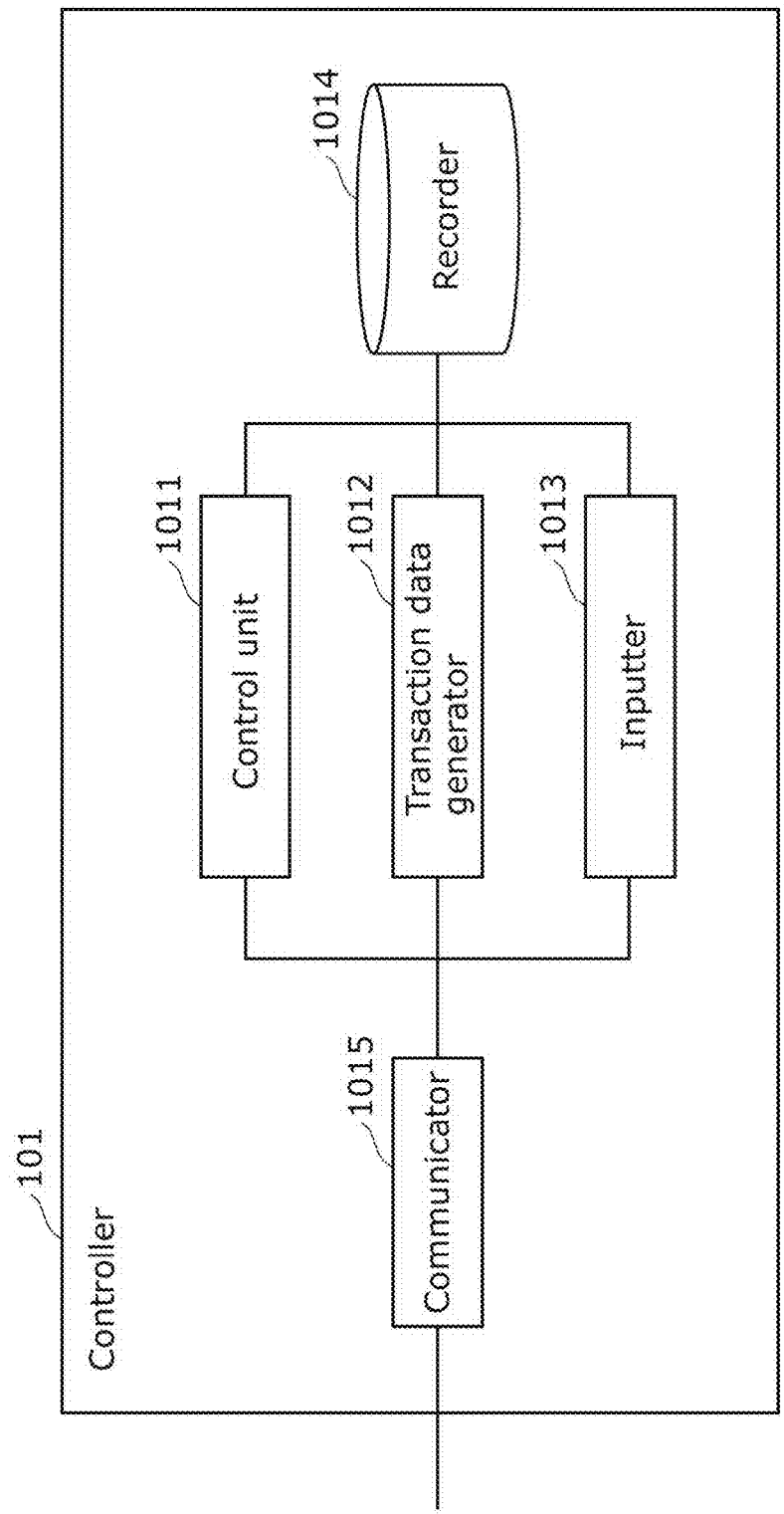
FIG. 3 is a block diagram illustrating an example of a configuration of a controller illustrated in FIG. 2.

FIG. 3 is a block diagram illustrating an example of a configuration of controller 101 illustrated in FIG. 2.

Controller 101 includes a processor (not illustrated) and a memory (not illustrated) storing a program that causes the processor to execute a predetermined process. In other words, controller 101 is implemented as the processor executes a predetermined program with the use of the memory. According to the present embodiment, as illustrated in FIG. 3, controller 101 includes controlling block 1011, transaction data generator 1012, inputter 1013, recorder 1014, and communicator 1015.
<Controlling Block 1011>

Controlling block 1011 may control an in-home device. In the example illustrated in FIG. 2, controlling block 1011 operates an in-home device such as air conditioner 104, body composition meter 105, or blood pressure gauge 106 or manages the performance history and the condition of an in-home device. Moreover, controlling block 1011 may display the performance condition of photovoltaic power generation device 102 and storage battery 103. For example, controlling block 1011 may display the power generation state of photovoltaic power generation device 102 or the power storage state of storage battery 103. Moreover, controlling block 1011 may display the condition of an in-home device or the vitals data measured by body composition meter 105 or blood pressure gauge 106.

Furthermore, controlling block 1011 may collect history information such as the performance history or the operation history of an in-home device or collect history information on the performance condition of photovoltaic power generation device 102 and storage battery 103. Moreover, controlling block 1011 may collect measurement data measured by an in-home device.

<Inputter 1013>

Inputter 1013 generates consent information concerning the utilization of obtained or collected data. In this example, consent information is information indicating that the user has consented to the utilization of data obtained or collected from the user, and such consent information is generated based on a user operation. Consent information may be generated when, for example, the user has selected or deselected a certain item from a list of data or a list of service providers, presented by inputter 1013, to which the data is to be provided. In this case, consent information includes a service provider to which the user has consented to providing data or an item or items of data or the type of data that the user has consented to providing. In other words, consent information includes a service provider to which the user has consented to providing data or an item or items of data or the type of data that the user has consented to providing. In this example, consent information may be information that indicates the user's consent to the term that, for example, data is provided to or made available for reference by a third party to the recipient of that data presented by inputter 1013, and this third party is selected based on the reliability or an incentive and in accordance with the user's predetermined criterion. This third party may belong to a group different from the group to which the recipient of the data presented by inputter 1013 belongs. Furthermore, consent information may include information indicating that the user consents to providing data if the user can receive a certain amount of feedback or more.

Inputter 1013 may generate a smart contract based on the generated consent information. In this example, this smart contract is being programmed to be able to determine whether data is allowed to be provided. This smart contract may include the consent information generated by inputter 1013.

In this example, inputter 1013 may be an application installed in controller 101. In that case, the installed application implements the above-described function of inputter 1013.

<Transaction Data Generator 1012>

Transaction data generator 1012 generates transaction data of a blockchain. According to the present embodiment, transaction data generator 1012 generates transaction data that includes consent information generated by inputter 1013. To be more specific, transaction data generator 1012 generates transaction data that includes, for example, a blockchain address held by the user, consent information including the service provider to which the user has consented to providing data or data or the type of data that the user has consented to providing, and a signature. In this example, transaction data generator 1012 may generate transaction data with an identifier further appended to the transaction data. Transaction data generator 1012 generates a signature by use of a signature generating key unique to each user.

Moreover, transaction data generator 1012 may generate transaction data that includes a smart contract generated by inputter 1013. In this example, transaction data generator 1012 may generate transaction data that includes consent information and a smart contract each generated by inputter 1013.

Moreover, transaction data generator 1012 may generate transaction data that includes a data obtaining request obtained via communicator 1015. In this example, a data obtaining request may be, for example, a request for allowing data server 310 belonging to a group different from the group to which controller 101 belongs to obtain or refer to data. In this case, transaction data generator 1012 may generate transaction data that includes a data obtaining request obtained via communicator 1015 and consent information with regard to that data obtaining request.

Moreover, transaction data generator 1012 may generate transaction data that includes information indicating data such as history information or measurement data obtained or collected by controlling block 1011. In this case, transaction data generator 1012 may generate transaction data that includes, for example, a blockchain address held by the user, information indicating the data obtained or collected by controlling block 1011, and a signature. In this example, information indicating data may be, for example, data obtained or collected by controlling block 1011 itself, the hash value of such data, or the hash value and the attribute information of such data.

The attribute information of data may include, for example, the type of the sensor or device that has obtained or collected the data. Meanwhile, in a case where the data is step count data, body weight data, body fat ratio data, or blood pressure data, the attribute information of the data may include data indices or the like indicating when and how such data was measured or collected and the indices used in the measurement or collection. In a case where an apparatus is an in-home device such as a home electrical appliance as well, data may include data indices indicating the performance history, the performance date and time, and so on of the apparatus.

Transaction data generator 1012 records the generated transaction data into recorder 1014. Transaction data generator 1012 transmits the generated transaction data to authentication server 200 via communicator 1015.

<Recorder 1014>

Recorder 1014 records data such as the history information or the measurement data collected by controlling block 1011. In addition, recorder 1014 records transaction data generated by transaction data generator 1012. Moreover, recorder 1014 may record consent information and a smart contract generated by inputter 1013.

<Communicator 1015>

Communicator 1015 communicates with authentication servers 200 and 210, data server 300, and service servers 400 and 410 via communication network 500. This communication may be carried out through the transport layer security (TLS). In this case, the encryption key for the TLS communication may be held in communicator 1015.

Next, an example of a configuration of terminal 110 will be described.

1.4 Configuration of Terminal 110

Figure 4:
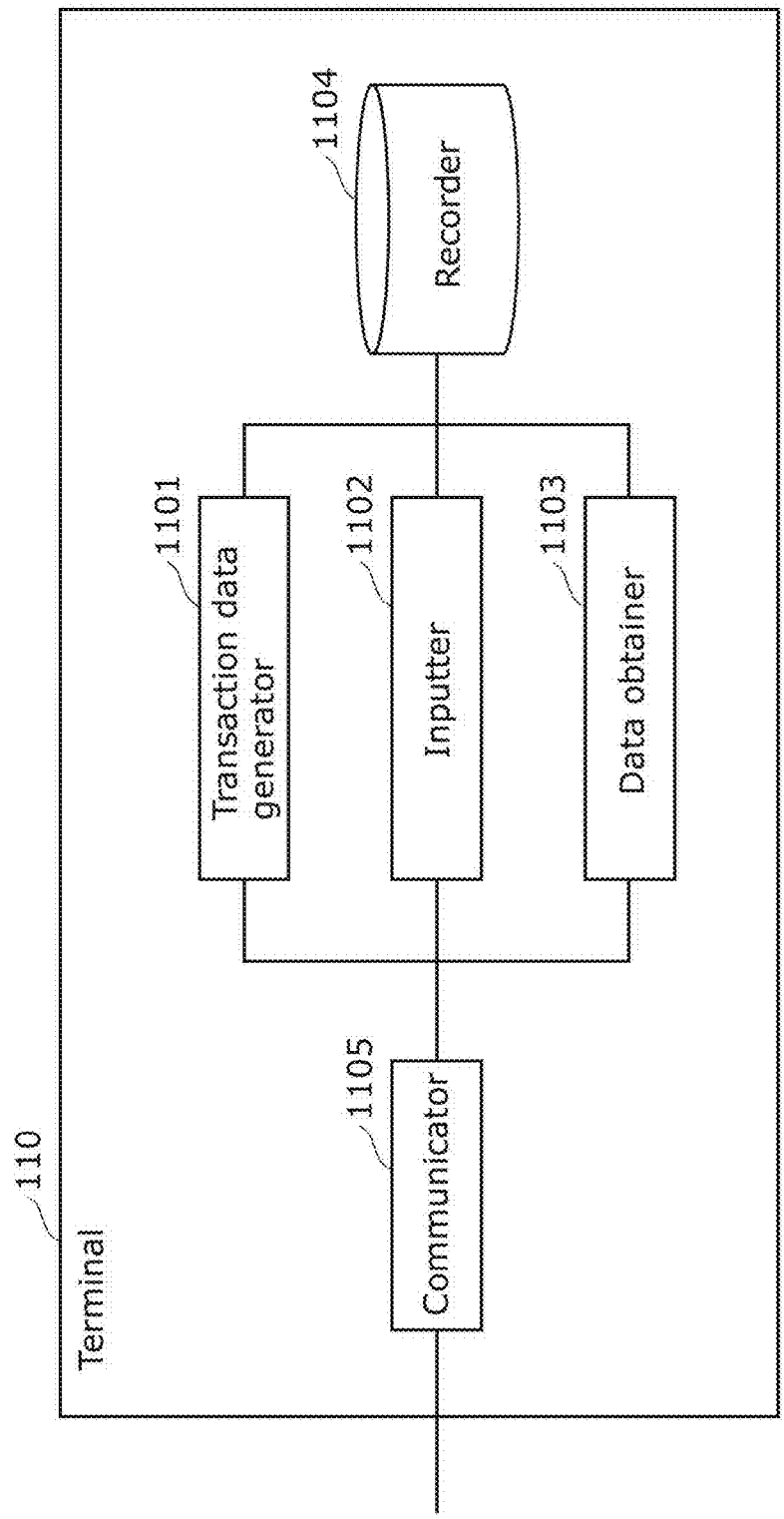
FIG. 4 is a block diagram illustrating an example of a configuration of a terminal according to one embodiment.

FIG. 4 is a block diagram illustrating an example of a configuration of terminal 110 according to the present embodiment. Terminal 110 is an example of an apparatus according to the present disclosure and is implemented as a processor executes a predetermined program with the use of a memory. Terminal 110 is, for example but not limited to, an apparatus that includes a display and an inputter, such as a smartphone, or an apparatus that obtains measurement data of a user, such as a wearable device.

According to the present embodiment, as illustrated in FIG. 4, terminal 110 includes transaction data generator 1101, inputter 1102, data obtainer 1103, recorder 1104, and communicator 1105. In the following description, data obtained or collected by terminal 110 is stored into data server 300 belonging to the first group.

<Inputter 1102>

Inputter 1102 generates the user's consent information concerning the utilization of data. As described above, consent information is information indicating that the user has consented to the utilization of data obtained or collected from the user, and such consent information is generated based on a user operation.

Consent information may be generated when, for example, the user has selected or deselected a certain item from a list of data or a list of service providers, presented by inputter 1102, to which data is to be provided. In this case, the user may select a service provider to which data is to be provided based on the purpose for which the data is used, the actual use record of data, or a feedback or an incentive to be given to the user in exchange for the use of the data. In one example of an incentive or a feedback given to the user, in exchange for providing data to a service provider, the user may be paid the incentive or the feedback in a virtual currency by the service provider or presented with information indicating that the user will be paid the incentive or the feedback in a virtual currency. In another example of an incentive or a feedback given to the user, in exchange for providing measurement data, such as the measurement history of a body composition meter or a blood pressure gauge, to an athletic club, the user can receive a free trial or a discounted membership from the athletic club or is presented with information indicating that the user will be able to receive a free trial or a discounted membership from the athletic club.

In this example, as described above, consent information may be information that indicates the user's consent to the term that, for example, data is provided to or made available for reference by a third party to the recipient of that data presented by inputter 1102, and this third party is selected based on the reliability or an incentive and in accordance with the user's predetermined criterion. This third party may belong to a group different from the group to which the data recipient presented by inputter 1102 belongs.

Moreover, based on the generated consent information, inputter 1102 may generate a smart contract being programmed to be able to determine whether data is allowed to be provided.

<Transaction Data Generator 1101>

Transaction data generator 1101 generates transaction data of a blockchain. According to the present embodiment, transaction data generator 1101 generates transaction data of a blockchain that includes consent information generated by inputter 1102. To be more specific, transaction data generator 1101 generates transaction data that includes, for example, a blockchain address held by the user, consent information including a service provider to which the user has consented to providing data or data or the type of data that the user has consented to providing, and a signature.

In this example, transaction data generator 1101 may generate transaction data with an identifier further appended to the transaction data. Transaction data generator 1101 may generate a signature by use of a signature generating key unique to each user.

Moreover, transaction data generator 1101 may generate transaction data that includes information indicating data obtained by data obtainer 1103. In this case, transaction data generator 1101 may generate transaction data that includes, for example, a blockchain address held by the user, information indicating the data obtained by data obtainer 1103, and a signature. Information indicating data may be, for example, data obtained by data obtainer 1103 itself, the hash value of such data, or the hash value and the attribute information of such data.

Moreover, transaction data generator 1101 may generate transaction data that includes a smart contract generated by inputter 1102. In this example, transaction data generator 1101 may generate transaction data that includes consent information and a smart contract each generated by inputter 1102.

Transaction data generator 1101 records the generated transaction data into recorder 1104. Transaction data generator 1101 transmits the generated transaction data to authentication server 200 or data server 300 via communicator 1105.

Moreover, transaction data generator 1101 may generate transaction data that includes a data obtaining request obtained via communicator 1105. In this example, a data obtaining request may be, for example, a request for allowing data server 310 belonging to a group different from the group to which terminal 110 belongs to obtain or refer to data. In this case, transaction data generator 1101 may generate transaction data that includes a data obtaining request obtained via communicator 1105 and consent information with regard to that data obtaining request.

<Data Obtainer 1103>

Data obtainer 1103 obtains data such as measurement data that a sensor in terminal 110 has obtained. For example, in a case where terminal 110 includes an acceleration sensor and a global positioning system (GPS) sensor, data obtainer 1103 obtains, as measurement data, step count data that includes the step count obtained from the acceleration sensor and the position information obtained from the GPS sensor. Moreover, data obtainer 1103 may obtain, as measurement data, blood pressure data or heartbeat data. In other words, data obtainer 1103 obtains data that a service provider can utilize.

Data obtainer 1103 records the obtained data into recorder 1104. Data obtainer 1103 may transmit the obtained data to data server 300 via communicator 1105.

<Recorder 1104>

Recorder 1104 records transaction data generated by transaction data generator 1101. Moreover, recorder 1104 records data obtained by data obtainer 1103. In this example, recorder 1104 may record consent information and a smart contract each generated by inputter 1102.

<Communicator 1105>

Communicator 1105 communicates with authentication server 200 and data server 300 via communication network 500. This communication may be carried out through TLS. In this case, the encryption key for the TLS communication may be held in communicator 1105.

Next, an example of a configuration of authentication server 200 will be described.

1.5 Configuration of Authentication Servers 200 and 210

Authentication servers 200 and 210 each manage data obtained from home 100 or terminal 110.

As described above, in this example, authentication server 200 and data server 300 belong to the first group, and authentication server 200 manages data in data server 300 by use of a blockchain technology. Herein, authentication server 200, that is, authentication servers 200a, 200b, and 200c are an example of a plurality of first authentication servers, and authentication server 200*a* is an example of one first authentication server among the plurality of first authentication servers.

Meanwhile, authentication server 210 and data server 310 belong to the second group, and authentication server 210 manages data in data server 310 by use of a blockchain technology. Herein, authentication server 210, that is, authentication servers 210*a*, 210*b*, and 210*c* are an example of a plurality of second authentication servers, and authentication server 210*c*, for example, is an example of one second authentication server among the plurality of second authentication servers.

Authentication servers 200*a*, 200*b*, 200*c*, 210*a*, 210*b*, and 210*c* have the same configuration, and thus authentication server 200*a* will be described below as an example.

Figure 5:
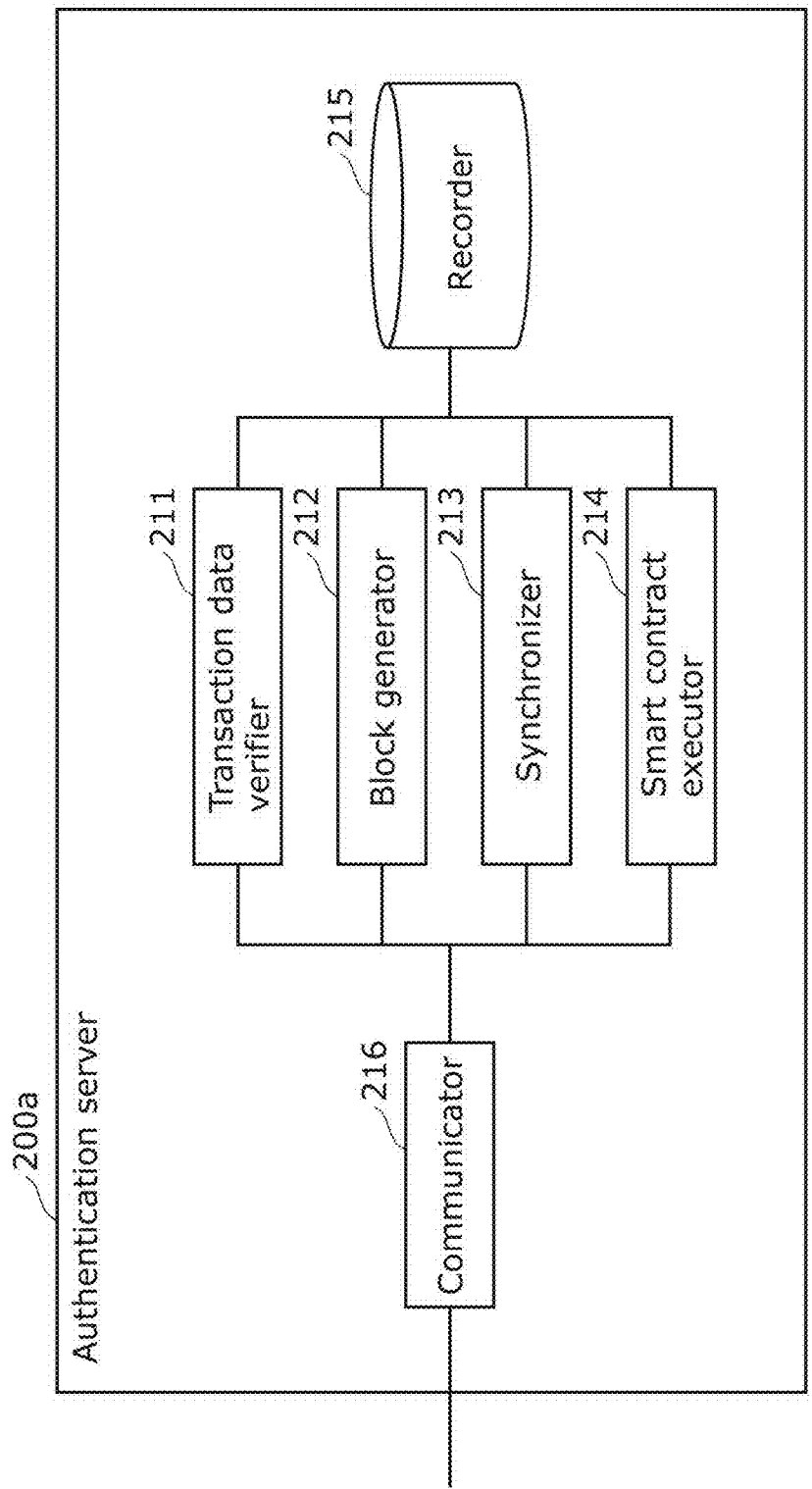
FIG. 5 is a block diagram illustrating an example of a configuration of an authentication server according to one embodiment.

FIG. 5 is a block diagram illustrating an example of a configuration of authentication server 200*a* according to the present embodiment.

As illustrated in FIG. 5, authentication server 200*a* includes transaction data verifier 211, block generator 212, synchronizer 213, smart contract executor 214, recorder 215, and communicator 216. Authentication server 200*a* may be implemented as a processor executes a predetermined program with the use of a memory. Now, each of the constituent elements will be described.

<Transaction Data Verifier 211>

Transaction data verifier 211 verifies obtained transaction data. Specifically, transaction data verifier 211 obtains transaction data from an apparatus, such as home 100 or terminal 110. Then, transaction data verifier 211 verifies whether the transaction data is in a proper format and whether the signature is legitimate. For example, in a case where transaction data verifier 211 verifies transaction data that includes a data obtaining request, transaction data verifier 211 verifies whether the address, the data obtaining request, and the signature included in the transaction data are legitimate. Herein, in a case where transaction data verifier 211 verifies transaction data that includes information indicating data, for example, transaction data verifier 211 may verify whether the address, the information indicating the data, and the signature included in the transaction data are legitimate.

In this manner, transaction data verifier 211 verifies transaction data by examining the legitimacy of the obtained transaction data.

If transaction data verifier 211 has confirmed the legitimacy of transaction data through the verification, transaction data verifier 211 records that transaction data into recorder 215. At this point, if transaction data verifier 211 has determined that the transaction data is legitimate, transaction data verifier 211 notifies synchronizer 213 to that effect.

<Block Generator 212>

Block generator 212 executes a consensus algorithm for transaction data between a plurality of authentication servers 200, if transaction data verifier 211 has successfully verified the transaction data. For the consensus algorithm, a consensus algorithm called Practical Byzantine Fault Tolerance (PBFT) or any other known consensus algorithms, such as Proof of Work (PoW), may be used.

According to the present embodiment, block generator 212 executes a consensus algorithm between authentication server 200*a*, authentication server 200*b*, and authentication server 200*c* belonging to the same group, that is, the first group. In other words, block generator 212 first generates a block of a blockchain that includes one or more items of transaction data. Then, block generator 212 executes a consensus algorithm. Thereafter, block generator 212 records the generated block into recorder 215 if a consensus has been established through the execution of the consensus algorithm. The block generated by block generator 212 is recorded upon being added to the blockchain by recorder 215.

Now, a data structure of a blockchain will be described.

Figure 6:
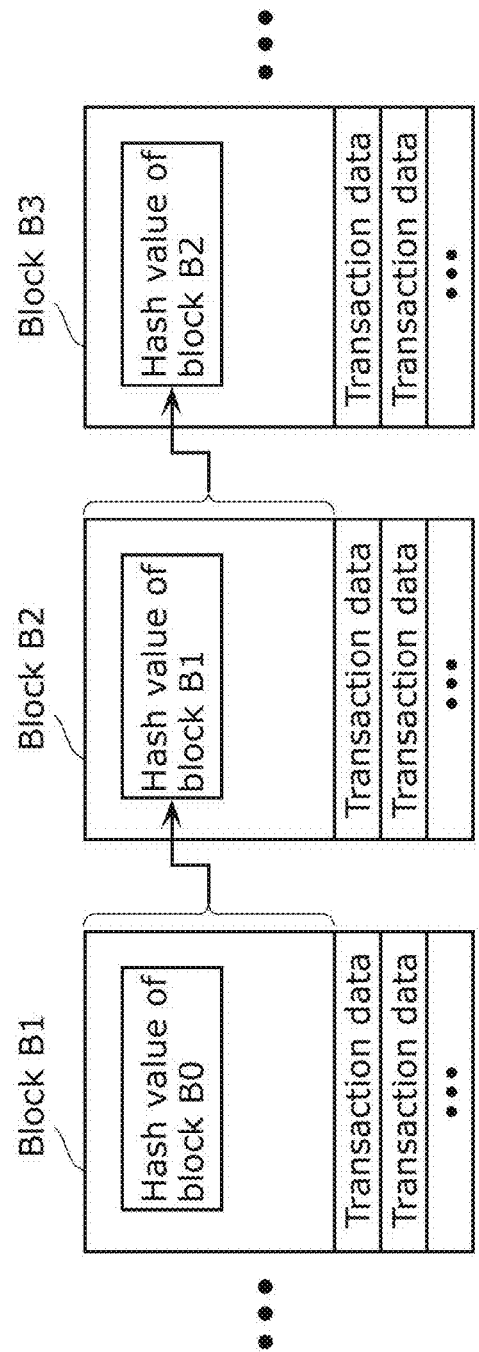
FIG. 6 is an illustration for describing a data structure of a blockchain.

FIG. 6 is an illustration for describing a data structure of a blockchain.

A blockchain is composed of blocks, each serving as a recording unit of the blockchain, connected in a chain-like manner. Each of the blocks includes a plurality of items of transaction data and the hash value of the block immediately preceding itself. Specifically, block B2 includes the hash value of block B1 preceding block B2. Then, the hash value calculated based on the plurality of items of transaction data included in block B2 and the hash value of block B1 is incorporated in block B3 as the hash value of block B2. In this manner, as the content of the preceding block is included in the form of a hash value and as such blocks are connected in a chain-like manner, any alteration of the connected transaction data can be prevented effectively.

If past transaction data is modified, the hash value of the modified block takes a value different from the value held before the modification. Therefore, in order to make an altered block appear as if no alteration were made, all the blocks following the altered block need to be recreated, and such an operation is very difficult in reality.

<Synchronizer 213>

Synchronizer 213 synchronizes blocks or items of transaction data within a blockchain between a plurality of authentication servers 200 (authentication servers 200*a*, 200*b*, and 200*c*) belonging to the same group, that is, the first group.

Synchronizers 213 of the plurality of authentication servers 200 synchronize items of transaction data within a blockchain through peer-to-peer synchronization. Then, each synchronizer 213 records the synchronized transaction data within the blockchain into recorder 215. For example, in response to transaction data verifier 211 verifying the legitimacy of transaction data, synchronizer 213 transfers the verified transaction data to authentication servers 200*b* and 200*c*, that is, other authentication servers 200. Moreover, if synchronizer 213 has received verified transaction data from another authentication server 200, synchronizer 213 records the received verified transaction data into recorder 215.

<Smart Contract Executor 214>

Smart contract executor 214 stores a smart contract recorded in the distributed ledger into a working memory. Smart contract executor 214 executes a smart contract stored in the working memory.

For example, a block that includes transaction data including a data obtaining request may be generated and recorded into the distributed ledger of authentication server 200*a*. Then, smart contract executor 214 stores, into the working memory, a smart contract generated based on the user's consent information. Smart contract executor 214 may execute the smart contract stored in the working memory and can thus cause the executed smart contract to determine whether data is allowed to be provided. Moreover, the executed smart contract provides a notification indicating the result of determining whether the data is allowed to be provided or grants an access privilege to a blockchain address included in the transaction data that includes the data obtaining request. In this manner, smart contract executor 214 executes a smart contract, for example, upon being triggered by an access from service server 400, and can thus manage the access to the data in data server 300 by service server 400.

In this example, in a case where a data obtaining request is a request for allowing data server 310 or the like belonging to the second group different from the first group to which authentication server 200a belongs to obtain or refer to data, the executed smart contract operates as follows. Specifically, the executed smart contract determines whether data is allowed to be provided to data server 310 or the like belonging to the second group based on the user's consent information. Then, if the executed smart contract has determined that the data is allowed to be provided, the smart contract may cause data server 300 belonging to the first group to transfer the user data to data server 310 or to make the user data available for reference by data server 310. In this manner, smart contract executor 214 executes a smart contract, upon being triggered by the fact that transaction data including a data obtaining request has been recorded into the distributed ledger, and then smart contract executor 214 provides data in data server 300 to a different group. Moreover, since the fact that the data has been transferred or made available for reference becomes recorded in the distributed ledger, the traceability of the data can be ensured.

Furthermore, for example, in response to transaction data that includes information concerning payment of an incentive or feedback provision having been recorded into the distributed ledger, smart contract executor 214 stores, into the working memory, a smart contract generated based on the payment of an incentive or the feedback provision. By executing the smart contract stored in the working memory, smart contract executor 214 can cause the executed smart contract to carry out the payment of an incentive or the feedback provision. The payment of an incentive or the feedback provision may be carried out in the form of a notification indicating that an incentive has been paid or a feedback has been provided or in the form of paying an incentive to the user or providing a feedback to the user.

<Recorder 215>

Recorder 215 records transaction data into the distributed ledger of authentication server 200a with the transaction data incorporated into a block. This distributed ledger may be provided inside recorder 215 or inside a storage device external to authentication server 200a.

In this example, such transaction data includes transaction data obtained from home 100 or terminal 110.

According to the present embodiment, if the legitimacy of transaction data received from an apparatus according to the present disclosure has been confirmed, recorder 215 records a block that includes this transaction data into the distributed ledger of authentication server 200a. In this example, blocks of a blockchain recorded in the distributed ledger may be made public to service server 400, home 100, or terminal 110.

<Communicator 216>

Communicator 216 communicates with home 100, terminal 110, authentication servers 200b and 200c, data server 300, and service server 400. Moreover, communicator 216 may communicate with authentication server 210. Such communication may be carried out through TLS. In this case, the encryption key for the TLS communication may be held in communicator 216.

In this manner, authentication server 200a performs a process for verifying the legitimacy of data obtained from home 100 or terminal 110, managing a permission concerning data provision, or providing data to service server 400. Moreover, authentication server 200a performs a process for managing a permission concerning providing data to the second group different from the first group to which authentication server 200a belongs or providing data to the second group. In this example, providing data may mean, for example, transferring the data or making the data available for reference.

In the foregoing description, data obtained from home 100 or terminal 110 is recorded into data server 300 and is not recorded into authentication server 200a. This, however, is not a limiting example. Such data may be recorded into authentication server 200a. In this case, such data may be incorporated into transaction data, and this transaction data may be recorded into the distributed ledger of authentication server 200a.

Next, data servers 300 and 310 will be described.

1.6 Configuration of Data Servers 300 and 310

Data servers 300 and 310 each record (store) data obtained from home 100 or terminal 110 and thus manage the data. Data servers 300 and 310 are an example of a plurality of data servers. Data server 300 is an example of one or more first data servers and belongs to the first group, as described above. Meanwhile, data server 310 is an example of one or more second data servers different from the one or more first data servers and belongs to the second group, as described above.

Data servers 300 and 310 have the same configuration, and thus data server 300 will be described below as an example.

Figure 7:
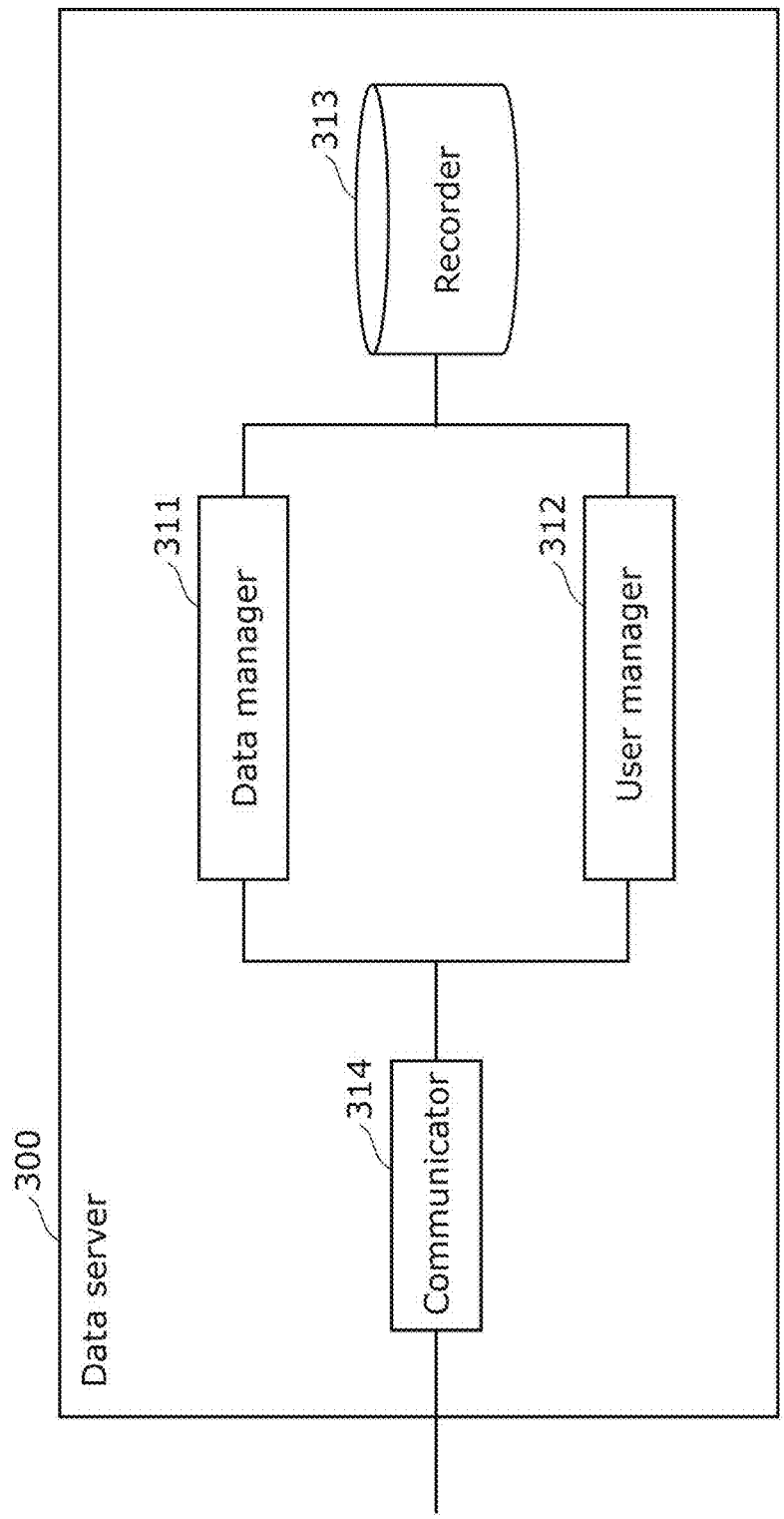
FIG. 7 is a block diagram illustrating an example of a data server according to one embodiment.

FIG. 7 is a block diagram illustrating an example of a configuration of data server 300 according to the present embodiment.

As illustrated in FIG. 7, data server 300 includes data manager 311, user manager 312, recorder 313, and communicator 314. Data server 300 may be implemented as a processor executes a predetermined program with the use of a memory. Now, each of the constituent elements will be described.

<Data Manager 311>

Data manager 311 manages data obtained from home 100 or terminal 110. According to the present embodiment, data manager 311 records data obtained from home 100 or terminal 110 into recorder 313. In this example, such obtained data may be data that an apparatus according to the present disclosure, such as home 100 or terminal 110, has obtained or collected from a user or user information. As described above, data to be obtained or collected is not limited to healthcare data and may be a user's personal data including vitals data, such as heartbeat data; measurement data; or history information of the apparatus, such as the performance history of the apparatus or the operation history of the apparatus.

Meanwhile, user manager 312 manages user information of the obtained data. User information is, for example, information concerning the user using terminal 110 or information concerning the user, such as the family structure including the user residing in home 100.

Data manager 311, in response to receiving a request for providing data from service server 400 that can access the first group to which data server 300 belongs, provides the data of the user based on the consent information recorded in the distributed ledger of authentication server 200. For example, a smart contract generated based on the consent information is executed in authentication server 200, and data server 300 receives a notification indicating that data server 300 is allowed to provide the data from authentication server 200. In this case, data manager 311 further provides the data of the user in response to receiving a request for providing data from service server 400. In this example, data manager 311 may also receive, from service server 400, a blockchain address corresponding to the data that is to be provided as well as the request for providing data.

Meanwhile, if data manager 311 has received a request for providing data to authentication server 200a belonging to the first group from, for example, service server 410 that can access the second group but cannot access the first group, data manager 311 operates as follows. Specifically, data manager 311, controlled by authentication server 200a based on the consent information, transfers the data of the user recorded in recorder 313 to, for example, data server 310 belonging to the second group or makes the data of the user recorded in recorder 313 available for reference by data server 310. In this manner, data manager 311, controlled by authentication server 200a based on the consent information, provides data to data server 310 of, for example, the second group different from the group to which data manager 311 belongs.

<Recorder 313>

Recorder 313 records data obtained from an apparatus according to the present disclosure, such as home 100 or terminal 110.

<Communicator 314>

Communicator 314 communicates with home 100, terminal 110, authentication server 200, and service server 400 via communication network 500. Moreover, communicator 314 may communicate with data server 310 or service server 400 via communication network 500. Such communication may be carried out through TLS. In this case, the encryption key for the TLS communication may be held in communicator 314.

In this manner, data server 300 belonging to the first group records data obtained from home 100 or terminal 110. Moreover, data server 300 belonging to the first group provides data to data server 310 belonging to the second group different from the group to which data server 300 belongs, in accordance with a smart contract and under the control of authentication server 200. As described above, providing data means, for example, transferring the data and/or making the data available for reference.

In the foregoing description according to the present embodiment, data server 300 and authentication server 200 are each an independent server, but this is not a limiting example. The function of data server 300 may be carried out within the function of authentication server 200.

Next, an example of a configuration of service servers 400 and 410 will be described.

1.7 Configuration of Service Server 400

Service servers 400 and 410 are each a server managed by a different service provider and each manage users of a service that the service provider provides as well as the service. Examples of such a service provider include an athletic club. Service servers 400 and 410 each utilize data obtained from each terminal 110 and/or home 100 and provide a service. According to the present embodiment, service server 400 cannot access the second group but can access the first group and can utilize data held in data server 300 belonging to the first group. Meanwhile, service server 410 cannot access the first group but can access the second group and can utilize data held in data server 310 belonging to the second group.

Service servers 400 and 410 have the same configuration, and thus service server 400 will be described below as an example.

FIG. 8 is a block diagram illustrating an example of a configuration of service server 400 according to the present embodiment.

As illustrated in FIG. 8, service server 400 includes service manager 411, user manager 412, transaction data generator 413, recorder 414, and communicator 415. Service server 400 may be implemented as a processor executes a predetermined program with the use of a memory. Now, each of the constituent elements will be described.

<Service Manager 411>

Service manager 411 utilizes information on a user managed by user manager 412 and provides a service. For example, service manager 411 obtains, from data server 300, data including measurement data such as the measured body composition value or the measured blood pressure value of the user. Then, service manager 411 provides a new healthcare service or verifies the effect.

By utilizing the information on the user managed by user manager 412, service manager 411 generates a data obtaining request indicating a request for obtaining data and transmits the generated data obtaining request to transaction data generator 413. Service manager 411 determines, for example, the kind of user data that service manager 411 wants to obtain and generates a data obtaining request based on, for example but not limited to, the attribute information of the user that service manager 411 wants to obtain or the type of data that service manager 411 wants to obtain. A data obtaining request may include, for example, a request that specifies the identifier of the user if the identifier of the user is known in advance, a request specified by a blockchain address, or a request that specifies an attribute. An attribute as used herein may be the type of an apparatus, such as home 100 or terminal 110, the type of data obtained from an apparatus, or an attribute of the user.

In this example, data that service manager 411 wants to obtain may not be recorded in data server 300 belonging to the first group but may be recorded only in data server 310 belonging to the second group different from the first group. In this case, service manager 411 transmits, via communicator 415, transaction data that includes a data obtaining request generated by transaction data generator 413 to authentication server 200 belonging to the first group and authentication server 210 belonging to the second group. If authentication server 210 belonging the second group has determined that authentication server 210 is allowed to provide data to data server 300 or the like in the first group, data held in data server 310 belonging to the second group is provided to data server 300 belonging to the first group, under the control of authentication server 210. In this manner, even in a case where data that service manager 411 wants to obtain is not recorded in data server 300 but is recorded only in data server 310, service manager 411 can obtain such data from data server 300 as the data is provided to data server 300.

Moreover, in response to obtaining data, service manager 411 generates information concerning payment of an incentive or feedback provision to the user whose data have been obtained in exchange for the obtained data and transmits the generated information to transaction data generator 413. In this example, the information concerning the payment of an incentive or the feedback provision may include information indicating that the user was compensated for the data that he or she has provided in a virtual currency and such a payment was made to the blockchain address of the user. Herein, service manager 411 may generate a smart contract based on the generated payment of an incentive or feedback provision. In this case, the smart contract may include, for example, a program for compensating the user for the data that he or she has provided in a virtual currency and for making such a payment to the blockchain address of the user.

<User Manager 412>

User manager 412 obtains information on a user to which a service is to be provided and manages the obtained information on the user.

<Transaction Data Generator 413>

Transaction data generator 413 generates transaction data that includes a data obtaining request generated by service manager 411.

Moreover, transaction data generator 413 generates transaction data that includes information concerning payment of an incentive or feedback provision generated by service manager 411.

Furthermore, transaction data generator 413 may generate transaction data that includes a smart contract that is based on payment of an incentive or feedback provision generated by service manager 411.

<Recorder 414>

Recorder 414 records information on a user necessary for providing a service or information on a service. In addition, recorder 414 records transaction data generated by transaction data generator 413. In this example, recorder 414 may record a data obtaining request generated by service manager 411, information concerning payment of an incentive or feedback provision generated by service manager 411, and a smart contract generated by service manager 411.

<Communicator 415>

Communicator 415 communicates with authentication server 200 and data server 300 via communication network 500. This communication may be carried out through TLS. In this case, the encryption key for the TLS communication may be held in communicator 415.

1.8 Overall Sequence of Data Distribution System 10

Figure 9A:
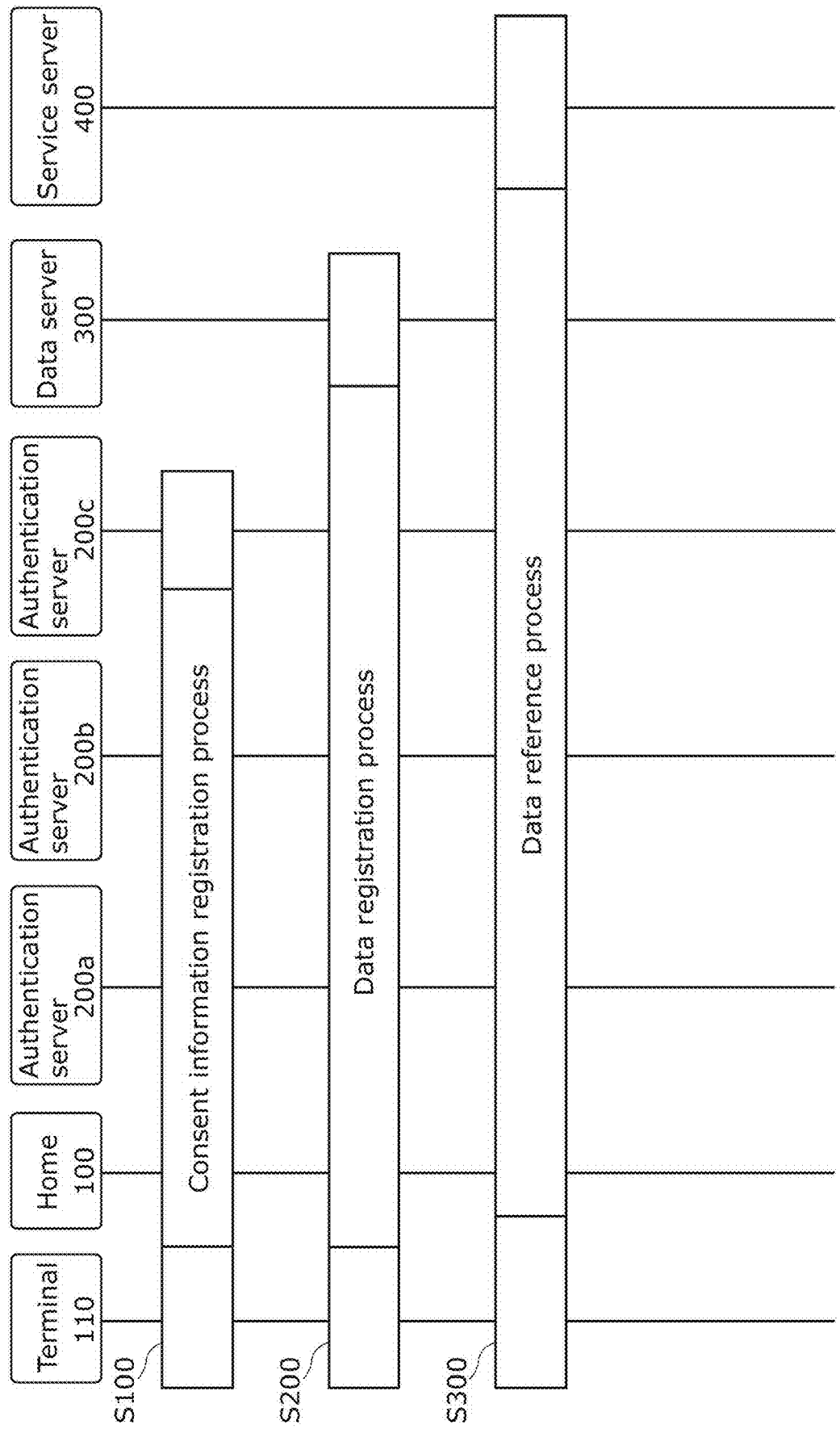
FIG. 9A is an overall sequence diagram of a data distribution system according to one embodiment.

Now, an overall sequence of data distribution system 10 will be described. FIG. 9A and FIG. 9B are an overall sequence diagram of data distribution system 10 according to the present embodiment. Each process will be described below.

As illustrated in FIG. 9A, at step S100, a consent information registration process is performed between terminal 110, home 100, and authentication servers 200a to 200c belonging to the first group. In FIG. 9A, the consent information registration process is performed, for example, between terminal 110 and authentication servers 200a to 200c belonging to the first group.

At step S200, a data registration process is performed between terminal 110, home 100, and authentication servers 200a to 200c and data server 300 belonging to the first group. In FIG. 9A, the data registration process is performed, for example, between home 100 and authentication servers 200a to 200c belonging to the first group.

At step S300, a data reference process is performed between terminal 110, home 100, authentication servers 200a to 200c, data server 300, and service server 400.

In this example, the data reference process at step S300 can be executed after the user's consent information has been registered in the consent information registration process at step S100. In FIG. 9A, the data reference process is performed, for example, between terminal 110, authentication servers 200a to 200c, data server 300, and service server 400.

As illustrated in FIG. 9B, at step S500, a data providing process is performed between terminal 110, service server 400, authentication servers 200 and data server 300 each belonging to the first group, and authentication servers 210 and data server 310 each belonging to the second group. The data providing process at step S500 can be executed after the data pertaining to the user has been registered in the data registration process at step S200. In the data providing process described later, data in data server 300 belonging to the first group is provided to data server 310 belonging to the second group.

1.8.1 Consent Information Registration Process

Now, the consent information registration process performed between terminal 110 and authentication servers 200a to 200c will be described.

Figure 10:
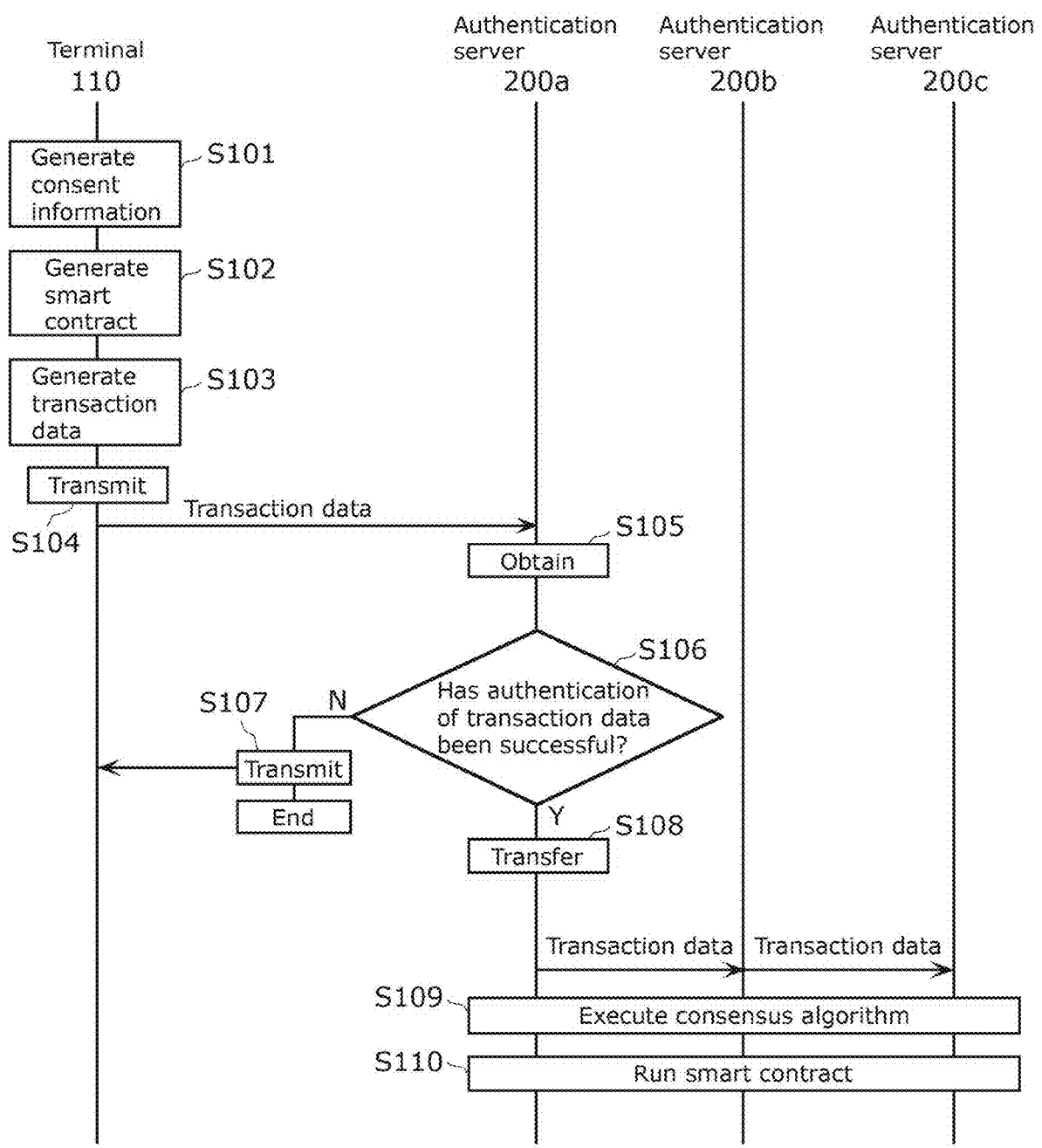
FIG. 10 is a sequence diagram illustrating a consent information registration process performed between a terminal and authentication servers according to one embodiment.

FIG. 10 is a sequence diagram illustrating a consent information registration process performed between terminal 110 and authentication servers 200a to 200c according to the present embodiment. FIG. 10 illustrates a case where terminal 110 registers consent information. The process is similar also in a case where controller 101 of home 100 registers consent information. FIG. 10 illustrates a consent information registration process performed between terminal 110 and authentication servers 200a to 200c belonging to the first group, but this is not a limiting example. The process is similar also in a case where the consent information registration process is performed between home 100 and authentication servers 210a to 210c belonging to the second group.

First, terminal 110 generates consent information based on a user operation (S101). At this point, terminal 110 may include an application serving as inputter 1013, and this application may generate consent information based on a user operation. In this case, the user can cause terminal 110 to generate consent information merely by indicating whether to select or deselect an item in a list of items of data or a list of service providers, presented by inputter 1013, to which the data is to be provided.

In this example, when the user is to cause terminal 110 to generate consent information, the user may cause terminal 110 to generate the consent information upon having determined whether a service provider provides a large amount of feedback. For example, the user may determine which data recipient to provide his or her data (i.e., consent to providing his or her data) based on the content of a feedback, such as whether the user is compensated in a virtual currency for the data that he or she provides to the service provider or whether the user is given a coupon or a discount from the service provider for the data that he or she provides to the service provider. Moreover, for example, the user may determine which data recipient to provide his or her data (i.e., consent to providing his or her data) based on the content of a feedback given to the user, such as the amount in a virtual currency by which the user is compensated for the data that he or she provides to the service provider or the amount of a coupon or a discount provided to the user for the data that he or she provides to the service provider. The content of a feedback may be made public by a service provider or recorded in a blockchain of authentication server 200.

Next, terminal 110 generates a smart contract based on the consent information generated at step S101 (S102). This smart contract is being programmed to be able to determine whether data is allowed to be provided. This smart contract may include the consent information generated at step S101. Furthermore, the smart contract may include a program that can determine whether to provide data if the amount of feedback is no lower than a certain level.

Next, terminal 110 generates transaction data that includes the generated consent information and the generated smart contract (S103).

Next, terminal 110 transmits the transaction data generated at step S103 to authentication server 200a (S104). In the example illustrated in FIG. 10, terminal 110 transmits the generated transaction data to authentication server 200a. Alternatively, terminal 110 may transmit the generated transaction data to authentication servers 200b and 200c. The process is similar also in a case where terminal 110 transmits the generated transaction data to authentication servers 200b and 200c.

Next, authentication server 200a obtains the transaction data from terminal 110 (S105) and verifies the obtained transaction data (S106).

If the verification of the transaction data is not successful at step S106 (N at S106), authentication server 200a transmits a notification to that effect to terminal 110 (S107).

Meanwhile, if the verification of the transaction data is successful at step S106 (Y at S106), authentication server 200a transfers the transaction data to other authentication servers 200 (authentication servers 200b and 200c) (S108). In this example, other authentication servers 200 also verify the transferred transaction data.

Next, authentication server 200a, authentication server 200b, and authentication server 200c execute a consensus algorithm (S109). Once authentication server 200a, authentication server 200b, and authentication server 200c verify that the transaction data is legitimate transaction data (i.e., the legitimacy of the transaction data), authentication server 200a, authentication server 200b, and authentication server 200c each generate a block including the transaction data. Then, authentication servers 200a, 200b, and 200c each record the block including the transaction data into the distributed ledger.

In this manner, the smart contract and the consent information that terminal 110 has generated become recorded into the distributed ledger.

Then, as the smart contract is recorded into the distributed ledger, the smart contract becomes executable, that is, starts running (S110). In this example, the smart contract, upon recorded into the distributed ledger, becomes stored in the working memory of authentication server 200a and so on, and thus the smart contract becomes executable.

1.8.2 Data Registration Process

Now, the data registration process performed between home 100, authentication servers 200a to 200c, and data server 300 will be described.

Figure 11:
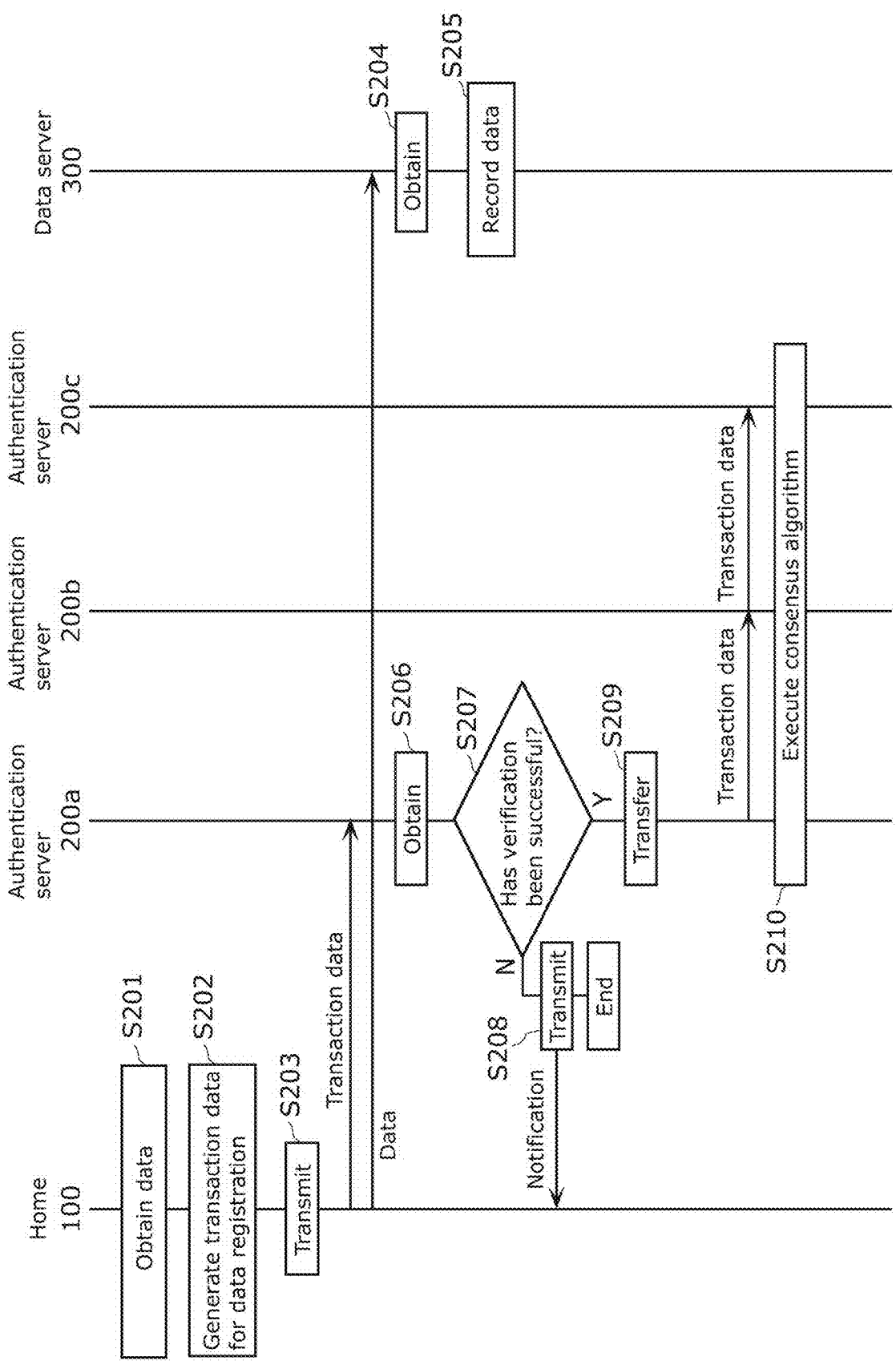
FIG. 11 is a sequence diagram illustrating a data registration process performed between a home, authentication servers, and a data server according to one embodiment.

FIG. 11 is a sequence diagram illustrating a data registration process performed between home 100, authentication servers 200a to 200c, and data server 300 according to the present embodiment. FIG. 11 illustrates a case where data obtained by home 100 is registered into data server 300. The process is similar also in a case where data obtained by terminal 110 is registered into data server 300. FIG. 11 illustrates a data registration process performed between home 100 and authentication servers 200a to 200c and data server 300 each belonging to the first group, but this is not a limiting example. The process is similar also in a case where the data registration process is performed between home 100 and authentication servers 210a to 210c and data server 310 each belonging to the second group.

First, home 100 obtains data obtained by an in-home device or the like in home 100 (S201). Data that home 100 obtains may be, for example, the operation history of an in-home device, the amount of electric power generated by photovoltaic power generation device 102, or the data pertaining to the amount of electric power that storage battery 103 outputs. Moreover, data that home 100 obtains may be the operation history of air conditioner 104 or the vitals data measured by body composition meter 105 and/or blood pressure gauge 106. In other words, the data may be any data that is obtained by home 100 and that a service provider can utilize.

Next, home 100 generates transaction data for data registration that includes information concerning the data obtained at step S201 (S202). The information concerning the data at this point is, for example, the hash value and the attribute information of the data. In this case, the transaction data includes the blockchain address, the hash value, the attribute information, and the signature. Next, home 100 transmits the data obtained at step S201 to authentication server 200a and transmits the transaction data generated at step S202 to data server 300 (S203). In the example illustrated in FIG. 11, home 100 transmits the transaction data obtained at step S201 to authentication server 200a. Alternatively, home 100 may transmit the transaction data to authentication servers 200b and 200c. The process is similar also in a case where home 100 transmits the transaction data to authentication servers 200b and 200c.

Next, data server 300 obtains the data from home 100 (S204), and data server 300 records the data obtained at step S204 (S205).

Next, authentication server 200a obtains the transaction data from home 100 (S206) and verifies the obtained transaction data (S207). The order of step S204 and step S206 is not set and may be changed.

If the verification of the transaction data is not successful at step S207 (N at S207), authentication server 200a transmits a notification to that effect to home 100 (S208). In this example, authentication server 200a is not limited to notifying home 100 to that effect and may also notify data server 300 to that effect. Furthermore, in this case, data server 300 may delete the data recorded at step S205.

Meanwhile, if the verification of the transaction data is successful at step S207 (Y at S207), authentication server 200a transfers the transaction data to other authentication servers 200 (authentication servers 200b and 200c) (S209). In this example, other authentication servers 200 also verify the transferred transaction data.

Next, authentication server 200a, authentication server 200b, and authentication server 200c execute a consensus algorithm (S210). Once authentication server 200a, authentication server 200b, and authentication server 200c verify that the transaction data is legitimate transaction data (i.e., the legitimacy of the transaction data), authentication server 200a, authentication server 200b, and authentication server 200c each generate a block including the transaction data. Then, authentication servers 200a, 200b, and 200c each record the block including the transaction data into the distributed ledger.

In this manner, a block that includes transaction data for data registration including information concerning data is recorded into the distributed ledger, and the data itself is recorded into data server 300.

1.8.3 Data Reference Process

Now, the data reference process performed between terminal 110, authentication servers 200a to 200c, data server 300, and service server 400 will be described.

Figure 12A:
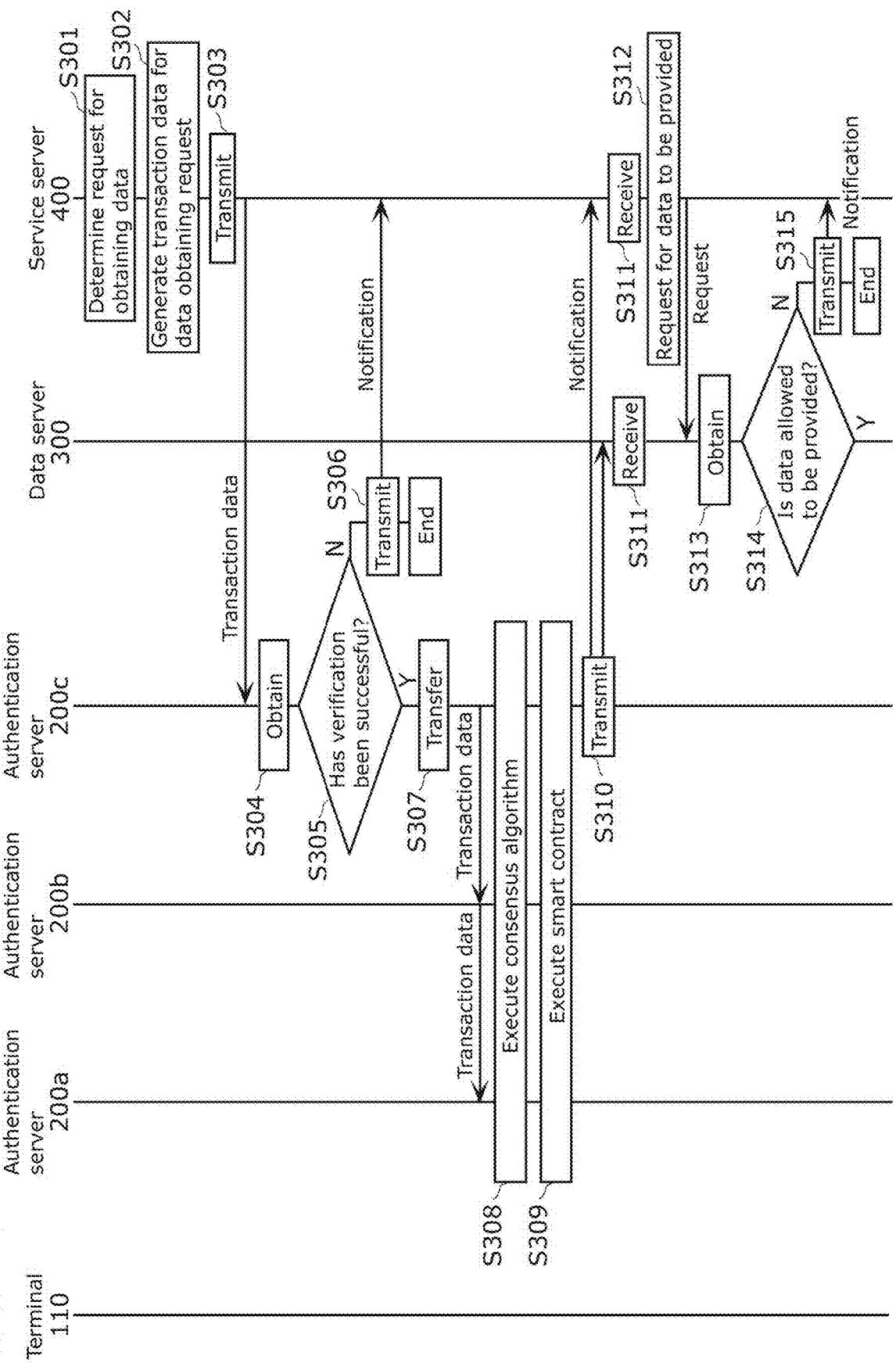
FIG. 12A is a sequence diagram illustrating a data reference process performed between a terminal, authentication servers, a data server, and a service server according to one embodiment.
Figure 12B:
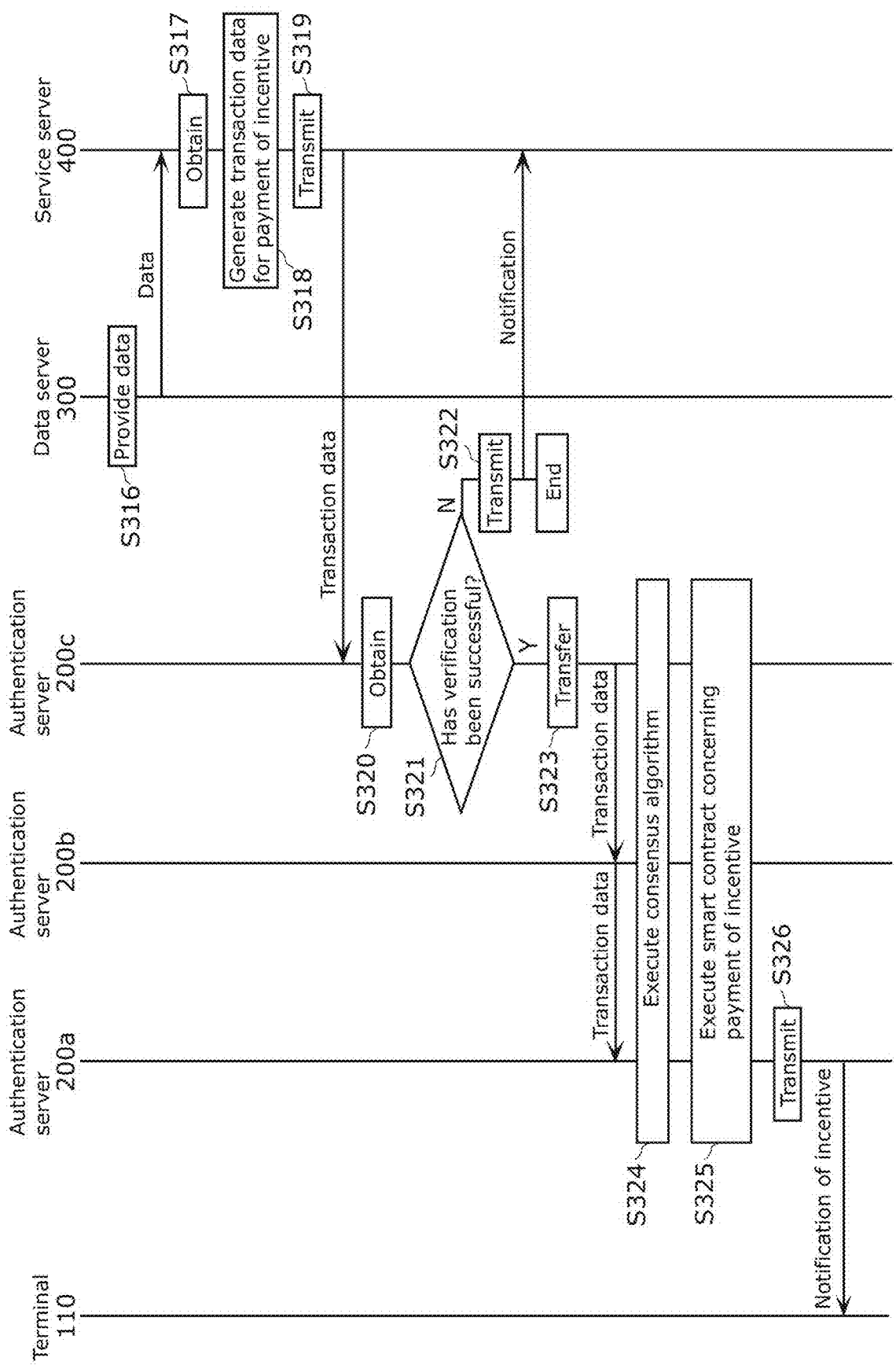
FIG. 12B is a sequence diagram illustrating a data reference process performed between a terminal, authentication servers, a data server, and a service server according to one embodiment.

FIG. 12A and FIG. 12B are a sequence diagram illustrating a data reference process performed between terminal 110, authentication servers 200a to 200c, data server 300, and service server 400 according to the present embodiment. In the example illustrated in FIG. 12A and FIG. 12B, service server 400 obtains data from data server 300. In this example, the process is similar also in a case where the data reference process is performed between terminal 110, service server 410, and authentication servers 210a to 210c and data server 310 each belonging to the second group. In other words, the process is similar also in a case where service server 410 obtains data from data server 310.

First, referring to FIG. 12A, for example, upon determining the kind of user data that service server 400 wants to obtain, service server 400 determines to make a request for obtaining data (S301).

Next, service server 400 generates a data obtaining request indicating a request for obtaining data and generates transaction data for the data obtaining request including the data obtaining request (S302).

Next, service server 400 transmits the generated transaction data to authentication server 200c (S303). In the example illustrated in FIG. 12A, service server 400 transmits the transaction data generated at step S302 to authentication server 200c. Alternatively, service server 400 may transmit the transaction data generated at step S302 to authentication servers 200a and 200b. The process is similar also in a case where service server 400 transmits the transaction data to authentication servers 200a and 200b.

Next, authentication server 200c obtains the transaction data from service server 400 (S304) and verifies the obtained transaction data (S305).

If the verification of the transaction data is not successful at step S305 (N at S305), authentication server 200c transmits a notification to that effect to service server 400 (S306).

Meanwhile, if the verification of the transaction data is successful at step S305 (Y at S305), authentication server 200c transfers the transaction data to other authentication servers 200 (authentication servers 200a and 200b) (S307). In this example, other authentication servers 200 also verify the transferred transaction data.

Next, authentication server 200a, authentication server 200b, and authentication server 200c execute a consensus algorithm (S308). Once authentication server 200a, authentication server 200b, and authentication server 200c verify that the transaction data is legitimate transaction data (i.e., the legitimacy of the transaction data), authentication server 200a, authentication server 200b, and authentication server 200c each generate a block including the transaction data. Then, authentication servers 200a, 200b, and 200c each record the block including the transaction data into the distributed ledger.

Next, authentication server 200a, authentication server 200b, and authentication server 200c each execute a smart contract recorded in the distributed ledger (S309). This smart contract has been generated based on consent information. As this smart contract has been recorded in the distributed ledger, the smart contract has become stored in the working memory and is executable. Then, the smart contract executed by authentication servers 200 determines, based on the consent information, whether the data requested by service server 400 is allowed to be provided. The smart contract transmits a notification regarding the determination result to data server 300 and service server 400 (S310). In this example, the smart contract is not limited to transmitting the notification regarding the determination result to data server 300 and service server 400. The smart contract may notify terminal 110 used by the user that the data requested by service server 400 is allowed to be provided.

Next, data server 300 and service server 400 each receive the notification transmitted at step S310 (S311). In this example, the notification transmitted at step S310 indicates that the data requested by service server 400 is allowed to be provided.

Next, service server 400 requests data server 300 to provide the data (S312). In this example, service server 400 may access data server 300 to obtain the data.

Next, data server 300 obtains a request for providing the data from service server 400 (S313). Then, data server 300 checks the notification received from authentication server 200c at step S311 and determines whether data server 300 is allowed to provide the data requested by service server 400 (S314). In this example, if data server 300 checks the notification received from authentication server 200c at step S311 and determines that data server 300 is not allowed to provide the data requested by service server 400 at step S314 (N at S314), data server 300 transmits a notification to that effect to service server 400 (S315).

If data server 300 checks the notification received from authentication server 200 at step S311 and determines that data server 300 is allowed to provide the data requested by service server 400 at step S314 (Y at S314), data server 300 provides the requested data to service server 400 (S316).

Next, service server 400 obtains the requested data (S317).

Then, service server 400 generates transaction data for payment of an incentive (S318). To be more specific, service server 400 generates transaction data that includes information concerning the payment of an incentive.

Next, service server 400 transmits the transaction data generated at step S318 to authentication server 200c (S319). In the example illustrated in FIG. 12B, service server 400 transmits the generated transaction data to authentication server 200c. Alternatively, service server 400 may transmit the generated transaction data to authentication servers 200a and 200b. The process is similar also in a case where service server 400 transmits the transaction data to authentication servers 200a and 200b.

Next, authentication server 200c obtains the transaction data from service server 400 (S320) and verifies the obtained transaction data (S321).

If the verification of the transaction data is not successful at step S321 (N at S321), authentication server 200c transmits a notification to that effect to service server 400 (S322).

Meanwhile, if the verification of the transaction data is successful at step S321 (Y at S321), authentication server 200c transfers the transaction data to other authentication servers 200 (authentication servers 200a and 200b) (S323). In this example, other authentication servers 200 also verify the transferred transaction data.

Next, authentication server 200a, authentication server 200b, and authentication server 200c execute a consensus algorithm (S324). Once authentication server 200a, authentication server 200b, and authentication server 200c verify that the transaction data is legitimate transaction data (i.e., the legitimacy of the transaction data), authentication server 200a, authentication server 200b, and authentication server 200c each generate a block including the transaction data. Then, authentication servers 200a, 200b, and 200c each record the block including the transaction data into the distributed ledger.

Next, authentication server 200a, authentication server 200b, and authentication server 200c each execute a smart contract concerning the payment of an incentive recorded in the distributed ledger (S325). This smart contract has been generated based on the payment of an incentive. As this smart contract has been recorded in the distributed ledger, the smart contract has become stored in the working memory and is executable. According to the present embodiment, the smart contract concerning the payment of an incentive may make the payment of an incentive to the user.

Then, for example, the smart contract in authentication server 200a transmits, to the user (specifically, terminal 110), an incentive notification indicating that the payment of an incentive has been made (S326).

In this example, service server 400 may generate transaction data that includes information concerning feedback provision at step S318. In this case, at step S325, a smart contract concerning the feedback provision is executed.

In this manner, the data reference process is performed between terminal 110, authentication servers 200a to 200c, data server 300, and service server 400, and an incentive paying process is performed thereafter.

In the example of the data reference process illustrated in FIG. 12A, the smart contract executed by authentication servers 200 transmits the determination result to data server 300 and service server 400 at step S310, but this is not a limiting example. The smart contract executed by authentication servers 200 may further transmit, at step S310, a notification indicating that service server 400 is to obtain the data to the user, that is, to terminal 110.

Moreover, in the example of the data reference process illustrated in FIG. 12A, at step S311 and step S312, service server 400 obtains the requested data after receiving the determination result of the smart contract executed by authentication servers 200, but this is not a limiting example. At step S309, the smart contract executed by authentication servers 200 may provide, to service server 400, the data recorded in data server 300 and requested by service server 400.

1.8.4 Smart Contract Registration Process Concerning Payment of Incentive

Next, a smart contract registration process concerning payment of an incentive performed between authentication servers 200a to 200c and service server 400 will be described.

FIG. 13 is a sequence diagram illustrating a smart contract registration process concerning payment of an incentive performed between authentication servers 200a to 200c and service server 400 according to the present embodiment. In the example illustrated in FIG. 13, a smart contract registration process is performed between service server 400 and authentication servers 200a to 200c belonging to the first group, but this is not a limiting example. The process is similar also in a case where the consent information registration process is performed between service server 410 and authentication servers 210a to 210c belonging to the second group.

First, service server 400 generates a smart contract concerning payment of an incentive (S401).

Next, service server 400 generates transaction data for smart contract registration that includes the smart contract concerning the payment of an incentive generated at step S401 (S402).

Next, service server 400 transmits the transaction data generated at step S402 to authentication server 200a (S403). In the example illustrated in FIG. 13, service server 400 transmits the transaction data generated at step S402 to authentication server 200a. Alternatively, service server 400 may transmit the transaction data generated at step S402 to authentication servers 200b and 200c. The process is similar also in a case where service server 400 transmits the transaction data to authentication servers 200b and 200c.

Next, authentication server 200a obtains the transaction data from service server 400 (S404) and verifies the obtained transaction data (S405).

If the verification of the transaction data is not successful at step S405 (N at S405), authentication server 200a transmits a notification to that effect to service server 400 (S406).

Meanwhile, if the verification of the transaction data is successful at step S405 (Y at S405), authentication server 200a transfers the transaction data to other authentication servers 200 (authentication servers 200b and 200c) (S407). In this example, other authentication servers 200 also verify the transferred transaction data.

Next, authentication server 200a, authentication server 200b, and authentication server 200c execute a consensus algorithm (S408). Once authentication server 200a, authentication server 200b, and authentication server 200c verify that the transaction data is legitimate transaction data (i.e., the legitimacy of the transaction data), authentication server 200a, authentication server 200b, and authentication server 200c each generate a block including the transaction data. Then, authentication servers 200a, 200b, and 200c each record the block including the transaction data into the distributed ledger.

Next, the smart contract concerning the payment of an incentive included in the transaction data is recorded into the distributed ledger, and thus the smart contract becomes executable, that is, starts running (S409). The smart contract concerning the payment of an incentive, upon recorded into the distributed ledger, becomes stored in the working memory of authentication server 200a and so on, and thus the smart contract becomes executable.

1.8.5 One Example of Data Providing Process

Now, a data providing process performed between terminal 110, service server 400, authentication servers 200 and data server 300 each belonging to the first group, and authentication servers 210 and data server 310 each belonging to the second group will be described.

Figure 14A:
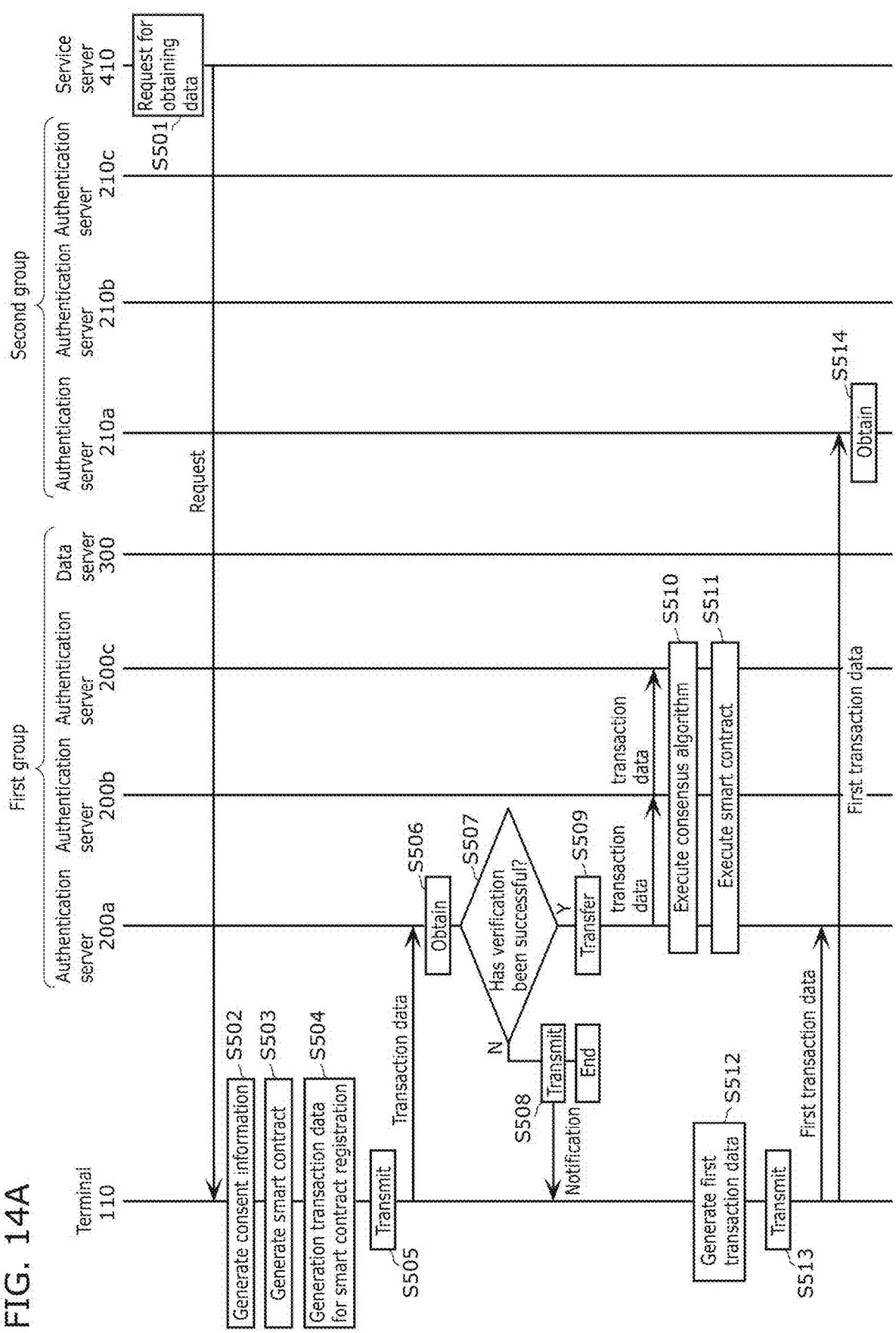
FIG. 14A is a sequence diagram illustrating an example of a data providing process performed by a data distribution system according to one embodiment.
Figure 14B:
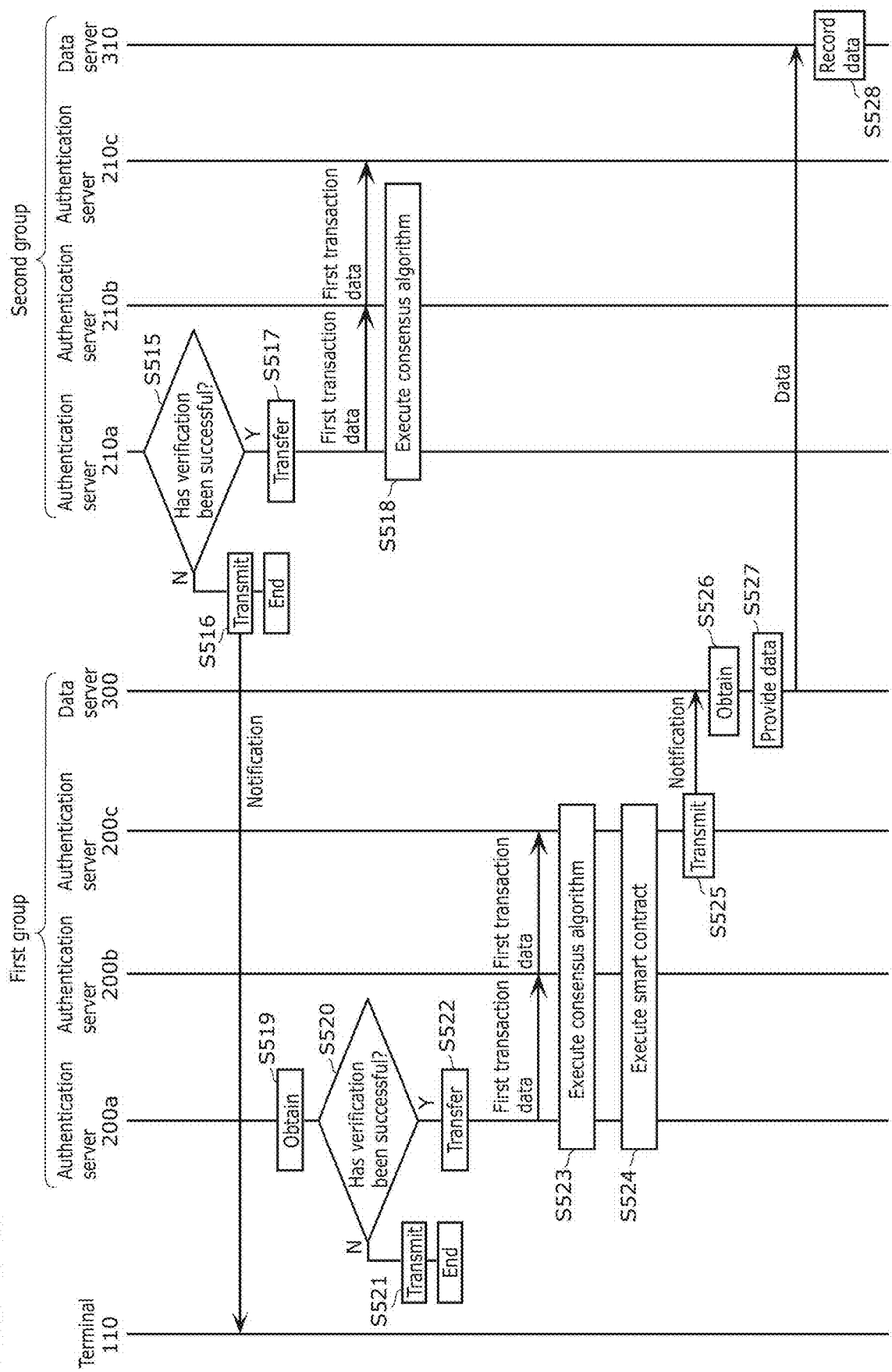
FIG. 14B is a sequence diagram illustrating an example of a data providing process performed by a data distribution system according to one embodiment.

FIG. 14A and FIG. 14B are a sequence diagram illustrating an example of a data providing process performed by the data distribution system according to the present embodiment. In the example illustrated in FIG. 14A and FIG. 14B, data that service server 410 wants to obtain is not in data server 310 that service server 410 can access but in data server 300 that service server 410 cannot access. Then, in the case described below, the data is provided from data server 300 to data server 310 based on a request from service server 410 for obtaining the data. In one specific use case described herein, service server 410 of a service provider makes data pertaining to terminal 110 recorded in data server 300 provided to data server 310, and utilizes the data in data server 310 for a service. In this example, the process is similar also in a case where data is provided from data server 310 to data server 300 based on a request from service server 400 for obtaining the data.

First, referring to FIG. 14A, in order to obtain user data, service server 410 generates a request for obtaining data and transmits the generated request to terminal 110 that has registered data into data server 300 (S501). The request for obtaining data indicates, for example, that service server 410 is requesting to obtain or refer to the data pertaining to terminal 110. In this example, service server 410 transmits the request for obtaining data directly to terminal 110. Alternatively, service server 410 may transmit such a request via email or via another service provider.

Next, terminal 110 receives the request transmitted at step S501 and generates consent information based on the request that terminal 110 has received (S502). At this point, terminal 110 may include an application serving as inputter 1013, and this application may generate the consent information based on the request through a user operation. For example, the user can select data that can be provided merely by selecting or deselecting an item from a list of items of data recorded in data server 300 that is to receive the data. With this configuration, terminal 110 can generate, as the consent information concerning the utilization of data, consent information indicating that the requested data can be provided upon the consent of the user.

Next, terminal 110 generates a smart contract based on the consent information generated at step S502 (S503). This smart contract is being programmed to be able to determine whether data is allowed to be provided based on the consent information.

Next, terminal 110 generates transaction data for smart contract registration that includes the generated consent information and the generated smart contract (S504).

Next, terminal 110 transmits the transaction data generated at step S504 to authentication server 200a (S505). In the example illustrated in FIG. 14A, terminal 110 transmits the generated transaction data to authentication server 200a. Alternatively, terminal 110 may transmit the generated transaction data to authentication servers 200b and 200c. The process is similar also in a case where terminal 110 transmits the transaction data to authentication servers 200b and 200c.

Next, authentication server 200a obtains the transaction data from terminal 110 (S506) and verifies the obtained transaction data (S507).

If the verification of the transaction data is not successful at step S507 (N at S507), authentication server 200a transmits a notification to that effect to terminal 110 (S508).

Meanwhile, if the verification of the transaction data is successful at step S507 (Y at S507), authentication server 200a transfers the transaction data to other authentication servers 200 (authentication servers 200b and 200c) (S509). In this example, other authentication servers 200 also verify the transferred transaction data.

Next, authentication server 200a, authentication server 200b, and authentication server 200c execute a consensus algorithm (S510). Once authentication server 200a, authentication server 200b, and authentication server 200c verify that the transaction data is legitimate transaction data (i.e., the legitimacy of the transaction data), authentication server 200a, authentication server 200b, and authentication server 200c each generate a block including the transaction data. Then, authentication servers 200a, 200b, and 200c each record the block including the transaction data into the distributed ledger. In this manner, the smart contract that terminal 110 has generated becomes recorded into the distributed ledger.

Next, as the smart contract is recorded into the distributed ledger, the smart contract becomes executable, that is, starts running (S511). In this example, the smart contract, upon recorded into the distributed ledger, becomes stored in the working memory of authentication server 200a and so on, and thus the smart contract becomes executable.

Next, terminal 110 generates first transaction data that includes the request for obtaining data based on the request for obtaining data transmitted at step S501 and the consent information generated at step S502 (S512). Specifically, terminal 110 generates the first transaction data by incorporating the request for obtaining data and the consent to providing data from data server 300 to data server 310. At this point, terminal 110 includes an application serving as inputter 1013, as described above. Therefore, the application may confirm the execution of the smart contract at step S501 after generating the consent information at step S502. With this configuration, the application can generate the first transaction data that includes the request for obtaining data and the consent to providing data from data server 300 to data server 310.

Next, terminal 110 transmits the first transaction data generated at step S512 to authentication server 200a belonging to the first transaction data and authentication server 210a belonging to the second group (S513). Herein, authentication server 200a is an example of one first authentication server among a plurality of first authentication servers belonging to the first group, and authentication server 210a is an example of one second authentication server among a plurality of second authentication servers belonging to the second group.

Next, authentication server 210a belonging to the second group obtains the first transaction data from terminal 110 (S514) and verifies the obtained first transaction data (S515).

If the verification of the first transaction data is not successful at step S515 (N at S515), authentication server 210a transmits a notification to that effect to terminal 110 (S516).

Meanwhile, if the verification of the first transaction data is successful at step S515 (Y at S515), authentication server 210a transfers the first transaction data to other authentication servers 210 (authentication servers 210b and 210c) belonging to the second group (S517). In this example, other authentication servers 210 also verify the transferred first transaction data.

Next, authentication server 210a, authentication server 210b, and authentication server 210c execute a consensus algorithm (S518). Once authentication server 210a, authentication server 210b, and authentication server 210c verify that the first transaction data is legitimate transaction data (i.e., the legitimacy of the first transaction data), authentication server 210a, authentication server 210b, and authentication server 210c each generate a block including the first transaction data. Then, authentication servers 210a, 210b, and 210c each record the block including the first transaction data into the distributed ledger. In this manner, the first transaction data becomes recorded into the distributed ledgers belonging to the second group.

Meanwhile, authentication server 200a belonging to the first group obtains the first transaction data from terminal 110 (S519) and verifies the obtained first transaction data (S520).

If the verification of the first transaction data is not successful at step S520 (N at S520), authentication server 200a transmits a notification to that effect to terminal 110 (S521).

Meanwhile, if the verification of the first transaction data is successful at step S520 (Y at S520), authentication server 200a transfers the first transaction data to other authentication servers 200 (authentication servers 200b and 200c) belonging to the first group (S522). In this example, other authentication servers 200 also verify the transferred first transaction data.

Next, authentication server 200a, authentication server 200b, and authentication server 200c execute a consensus algorithm (S523). Once authentication server 200a, authentication server 200b, and authentication server 200c verify that the first transaction data is legitimate transaction data (i.e., the legitimacy of the first transaction data), authentication server 200a, authentication server 200b, and authentication server 200c each generate a block including the first transaction data. Then, authentication servers 200a, 200b, and 200c each record the block including the first transaction data into the distributed ledger. In this manner, the first transaction data becomes recorded into the distributed ledgers belonging to the first group.

Next, for example, authentication server 200c executes a smart contract made executable at step S511 based on the first transaction data recorded in the distributed ledger (S524). The executed smart contract transmits a notification, to data server 300, indicating that the specified data can be provided to data server 310 (S525). In this example, this notification may include the data to be provided and information on the entity to which the data is to be provided. Thus, data server 300 can transfer the data held therein to data server 310 or make the data held therein available for reference by data server 310. The case where data server 300 makes the data available for reference by data server 310 includes a case where data server 310 records access information to data server 300 and, when using the data, accesses data server 300 to obtain the data.

Next, data server 300 obtains the notification from authentication server 200c (S526) and provides the data to data server 310 based on the obtained notification (S527). In this example, data server 300 may provide the data to data server 310 by transferring the data specified by the notification to data server 310 or making the data specified by the notification available for reference by data server 310. In this example, data server 300 transfers the data specified by the notification to data server 310.

Next, data server 310 records the data provided from data server 300 (S528).

In this example, when the data is provided at step S527, service server 410 may make a payment of an incentive to terminal 110. The process of making the payment of an incentive is similar to the process described with reference to step S317 to step S326, and thus description thereof will be omitted.

Even in a case where data that service server 410 wants to obtain is not in data server 310 that service server 410 can access but in data server 300 that service server 410 cannot access as described above, the data can be provided from data server 300 to data server 310. Therefore, the data distribution system according to the embodiment makes data coordination possible between different groups. Moreover, since the fact that the data has been transferred or made available for reference becomes recorded in each of the distributed ledger belonging to the group from which the data has been provided and the distributed ledger belonging to the group that is different from the aforementioned group and to which the data has been provided, the data can be utilized while the data traceability is ensured.

1.8.6 Another Example of Data Providing Process

In the data providing process illustrated in FIG. 14A and FIG. 14B, terminal 110 generates a smart contract for providing data after receiving a request from service server 410 for obtaining data. This, however, is not a limiting example. Terminal 110 may generate a smart contract for providing data in advance and cause the smart contract to be executed. In this case, the smart contract may be executed when first transaction data satisfying the condition concerning whether the data can be provided as indicated in the smart contract becomes recorded into the distributed ledger, and the data to be provided may be provided automatically.

This case will be described below with reference to the drawings.

Figure 15B:
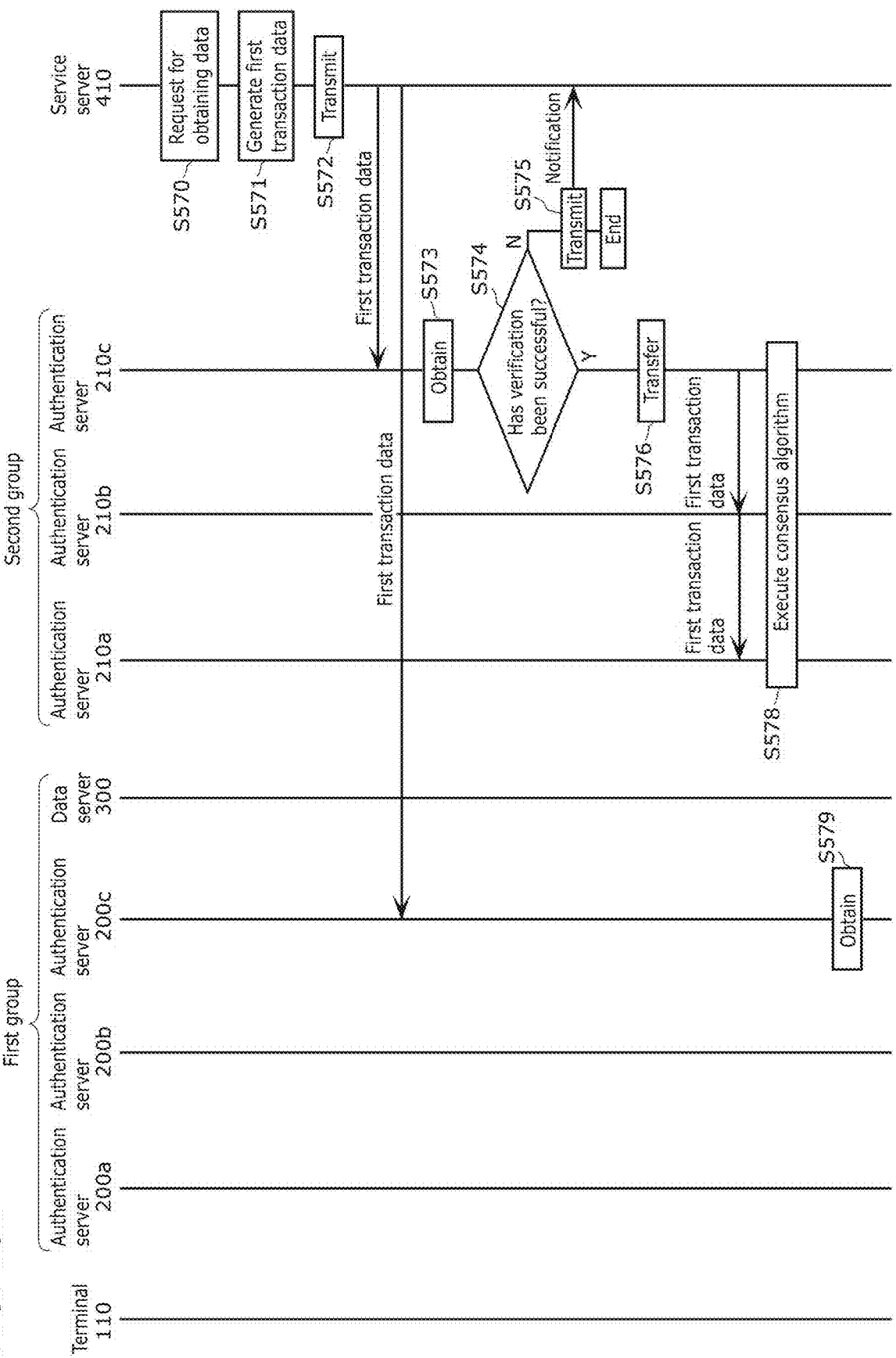
FIG. 15B is a sequence diagram illustrating another example of a data providing process performed by a data distribution system according to one embodiment.
Figure 15C:
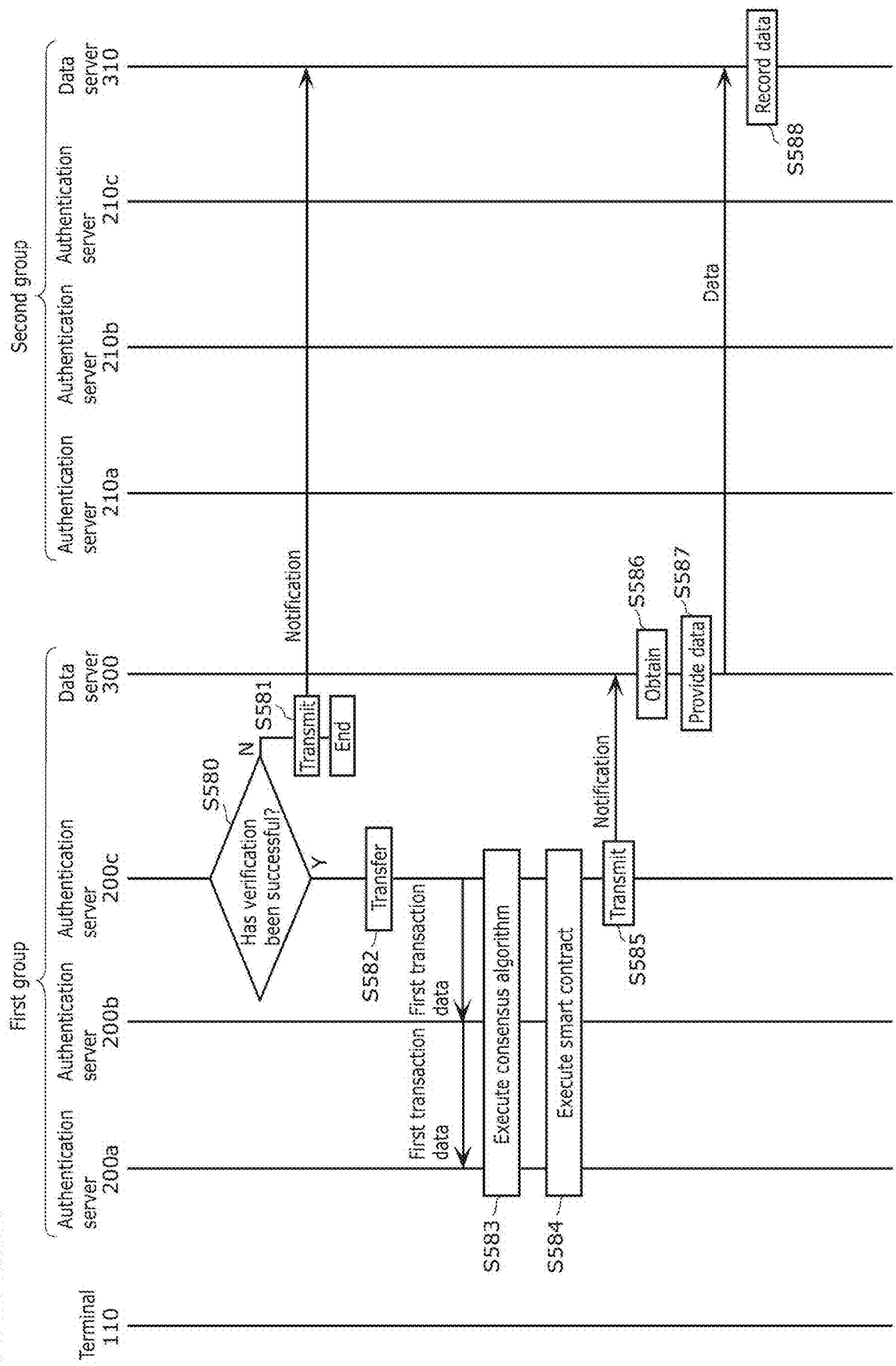
FIG. 15C is a sequence diagram illustrating another example of a data providing process performed by a data distribution system according to one embodiment.

FIG. 15A to FIG. 15C are a sequence diagram illustrating another example of a data providing process performed by the data distribution system according to the present embodiment. As in FIG. 14A and FIG. 14B, in this other example illustrated in FIG. 15A to FIG. 15C, a data providing process is performed between terminal 110, service server 400, authentication servers 200 and data server 300 each belonging to the first group, and authentication servers 210 and data server 310 each belonging to the second group. In the example illustrated in FIG. 15A to FIG. 15C as well, data that service server 410 wants to obtain is not in data server 310 that service server 410 can access but in data server 300 that service server 410 cannot access.

First, terminal 110 generates consent information based on a user operation (S551). At this point, terminal 110 may include an application serving as inputter 1013, and this application may generate the consent information based on a user operation.

Next, terminal 110 generates a smart contract based on the consent information generated at step S551 (S552). This smart contract is being programmed to be able to determine whether data is allowed to be provided based on the consent information.

Next, terminal 110 generates transaction data for smart contract registration that includes the generated consent information and the generated smart contract (S553).

In this example, the processes at step S554 to step S560 thereafter are similar to the processes at step S505 to step S511 described above, and thus description thereof will be omitted.

Next, referring to FIG. 15B, for example, upon determining the kind of user data that service server 410 wants to obtain, service server 410 determines to make a request for obtaining data (S570).

Next, service server 410 generates a data obtaining request indicating a request for obtaining data and generates first transaction data for the data obtaining request including the data obtaining request (S571).

Next, service server 410 transmits the first transaction data generated at step S571 to authentication server 210c belonging to the second group and authentication server 200c belonging to the first group (S572). Herein, authentication server 200c is an example of one first authentication server among a plurality of first servers belonging to the first group, and authentication authentication server 210c is an example of one second authentication server among a plurality of second authentication servers belonging to the second group. Moreover, data that service server 410 wants to obtain is not in data server 310 that service server 410 can access but in data server 300 that service server 410 cannot access. Therefore, service server 410 transmits the first transaction data generated at step S571 to authentication server 210c and authentication server 200c.

In this example, the processes at step S573 to step S578 thereafter are similar to the processes at step S514 to step S518 except that the entity that performs the processes is not authentication server 210a but authentication server 210c, and thus description thereof will be omitted.

Next, authentication server 200c obtains the first transaction data from service server 410 (S579) and verifies the obtained first transaction data (S580).

As illustrated in FIG. 15C, if the verification of the first transaction data is not successful at step S580 (N at S580), authentication server 200c transmits a notification to that effect to data server 310 (S581).

Meanwhile, if the verification of the first transaction data is successful at step S580 (Y at S580), authentication server 200c transfers the first transaction data to other authentication servers 200 (authentication servers 200a and 200b) belonging to the first group (S582). In this example, other authentication servers 200 also verify the transferred first transaction data.

The processes at step S583 to step S588 thereafter are similar to the processes at step S523 to step S528 described above, and thus description thereof will be omitted.

In the example illustrated in FIG. 15A, the user generates consent information at any desired timing by operating terminal 110, but this is not a limiting example. The user, by operating terminal 110, may generate consent information periodically or nonperiodically.

Moreover, the user may generate consent information when a new service provider has become available or when a new incentive or a new feedback has become available from an existing service provider. In this case, the content of the service provider that has newly become available or the content of the incentive or the feedback that has newly become available may be presented to terminal 110. Then, the user can generate new consent information based on the presented content. This configuration can increase the opportunities where the user provides data in order to utilize the data from terminal 110 or home 100.

1.9 Advantageous Effects of Embodiment

As described above, the data distribution method, the recording medium, and the data distribution system according to the present embodiment make it possible to utilize data while ensuring data traceability.

For example, even in a case where data that service server 410 wants to obtain is not in data server 310 that service server 410 can access but in data server 300 that service server 410 cannot access, the data can be provided from data server 300 to data server 310.

In other words, according to the present embodiment, information collected from home 100 and terminal 110 and stored in a data server belonging to one group can be provided to a data server belonging to another group securely with the consent of the user. This configuration makes it possible to utilize information on the user between a plurality of service providers. Accordingly, the present embodiment can provide a data distribution method and so on that enable data coordination between different groups.

Moreover, according to the present embodiment, the fact that data has been transferred or made available for reference becomes recorded in each of the distributed ledger belonging to the group from which the data has been provided and the distributed ledger belonging to the group that is different from the aforementioned group and to which the data has been provided. In this manner, the present embodiment enables coordination of data belonging to different groups while ensuring the traceability of that data by use of the blockchain technology. In other words, the present embodiment makes it possible to utilize data while ensuring data traceability. Accordingly, a user can provide his or her data trustingly.

Moreover, the present embodiment makes it possible to provide data between data servers in different groups based on consent information generated by home 100 or terminal 110. This configuration makes it possible to utilize data such as the history information of the user while restricting the distribution of such user data. Moreover, the present embodiment makes it possible to record the user's consent information securely into the distributed ledger employing the blockchain technology.

2. Other Modification Examples

The present disclosure has been described based on the foregoing embodiment. It is needless to say, however, that the present disclosure is not limited to the foregoing embodiment. The cases such as the following are also encompassed by the present disclosure.

(1) In the description according to the foregoing embodiment, authentication servers 200 and 210 are separate from data servers 300 and 310, but this is not a limiting example. Authentication server 200 and data server 300 may be the same device, and authentication server 210 and data server 310 may be the same device.

(2) In the description according to the foregoing embodiment, data servers 300 and 310 are separate from service servers 400 and 410, but this is not a limiting example. Data server 300 and service server 400 may be the same device, and data server 310 and service server 410 may be the same device.

(3) According to the foregoing embodiment, the user generates consent information based on an incentive and/or a feedback by operating controller 101 of terminal 110 or home 100, but this is not a limiting example. The user may generate consent information based on, for example but not limited to, the amount of user data that a service provider handles or the number of services cooperating with a service provider. This configuration can not only increase the data utilization but also increase service proposals made to the user by a service provider or the incentive or the like that a service provider provides. An incentive and/or a feedback may be recorded in authentication servers 200 and 210.

(4) Each device in the foregoing embodiment is specifically a computer system that includes, for example, a microprocessor, a read only memory (ROM), a random access memory (RAM), a hard disk unit, a display unit, a keyboard, and a mouse. The RAM or the hard disk unit has a computer program recorded thereon. The microprocessor operates in accordance with the computer program, and thus each device implements its function. In this example, a computer program includes a plurality of sets of command codes providing instructions to a computer to implement a predetermined function.

(5) A part or the whole of the constituent elements included in each device according to the foregoing embodiment may be implemented by a single system large scale integration (LSI) circuit. A system LSI circuit is an ultra-multifunctional LSI circuit manufactured by integrating a plurality of components on a single chip and is specifically a computer system that includes a microprocessor, a ROM, a RAM, and so on. The RAM has a computer program recorded thereon. The microprocessor operates in accordance with the computer program, and thus the system LSI circuit implements its function.

The constituent elements of each device described above may each be implemented by a single chip, or a part or the whole of such constituent elements may be implemented by a single chip.

Although the term system LSI circuit is used herein, depending on the difference in the degree of integration, such a circuit may also be called an integrated circuit (IC), an LSI circuit, a super LSI circuit, or an ultra LSI circuit. The technique for circuit integration is not limited to the LSI, and an integrated circuit may be implemented by a dedicated circuit or a general purpose processor. A field programmable gate array (FPGA) that can be programmed after an LSI circuit is manufactured or a reconfigurable processor in which the connections or the settings of the circuit cells within the LSI circuit can be reconfigured may also be used.

Furthermore, when a technique for circuit integration that replaces an LSI circuit appears through the advancement in the semiconductor technology or through a derived different technique, the functional blocks may be integrated by use of such different techniques. An application of biotechnology is a possibility.

(6) A part or the whole of the constituent elements in each device described above may be implemented by an IC card or a stand-alone module that can be attached to or detached from each device. The IC card or the module is a computer system that includes a microprocessor, a ROM, a RAM, and so on. The IC card or the module may include the ultra-multifunctional LSI circuit described above. The microprocessor operates in accordance with a computer program, and thus the IC card or the module implements its function. The IC card or the module may be tamper resistant.

(7) The present disclosure may be implemented as the method described above. Moreover, the present disclosure may be a computer program that implements the method described above by a computer or may be a digital signal composed of the computer program.

The present disclosure may be implemented in the form of a computer readable recording medium having the computer program or the digital signal recorded thereon, and examples of such a computer readable recording medium include a flexible disk, a hard disk, a CD-ROM, an MO, a DVD, a DVD-ROM, a DVD-RAM, a Blue-ray disc (BD) (registered trademark), and a semiconductor memory. Moreover, the present disclosure may be the digital signal recorded on any of the aforementioned recording media.

According to the present disclosure, the computer program or the digital signal may be transmitted via an electric communication circuit, a wireless or wired communication circuit, a network represented by the internet, data broadcast, or the like.

The present disclosure may provide a computer system that includes a microprocessor and a memory. The memory may have the computer program described above recorded thereon, and the microprocessor may operate in accordance with the computer program.

Alternatively, the program or the digital signal may be recorded on a recording medium such as those described above, and the recording medium may then be transported, or the program or the digital signal may be transported via a network or the like. Thus, the program or the digital signal may be executed by a separate stand-alone computer system.

(8) The foregoing embodiment and the modifications may be combined with each other.

INDUSTRIAL APPLICABILITY

The present disclosure can be used in data distribution methods, recording media, and data distribution system. The present disclosure can be used, for example, in a data distribution method, a recording medium, and a data distribution system that make it possible to refer to or transfer data between different groups based on a user's consent information and promote utilization of such data.

The invention claimed is:

1. A data distribution method in a data distribution system, the data distribution system including:
one or more first servers each including a first distributed ledger; and
one or more second servers different from the one or more first servers, the one or more second servers each including a second distributed ledger different from the first distributed ledger,
the data distribution method comprising:
obtaining, by one first server among the one or more first servers, first transaction data that includes a data obtaining request indicating a request for obtaining or referring to data pertaining to an apparatus;
determining, using consent information indicating that a user consents to utilization of the data pertaining to the apparatus, whether the one or more first servers are allowed to provide the data to the one or more second servers, the consent information being recorded in the first distributed ledger; and
in response to determining that the data is allowed to be provided, transferring the data pertaining to the apparatus held in the one or more first servers to at least one second server among the one or more second servers or making the data pertaining to the apparatus held in the one or more first servers available for reference by the one or more second servers.

2. The data distribution method according to claim 1, wherein
the data obtaining request is a request for allowing the one or more second servers different from the one or more first servers to obtain or refer to the data pertaining to the apparatus, and
the data pertaining to the apparatus that has been transferred to the at least one second server among the one or more second servers or has been made available for reference by the one or more second servers is provided to a device that has generated the first transaction data from the at least one second server among the one or more second servers.

3. The data distribution method according to claim 1, wherein
the first transaction data including the data obtaining request is transaction data transmitted to one first server among the one or more first servers by a device that cannot obtain data from the one or more first servers but can obtain data from the one or more second servers.

4. The data distribution method according to claim 1, wherein
the data pertaining to the apparatus is recorded in the first distributed ledger.

5. The data distribution method according to claim 1, wherein
the one or more second servers obtain the first transaction data, and
at least one second server among the one or more second servers does not provide the data pertaining to the apparatus to a device that has generated the first transaction data, until the data pertaining to the apparatus is transferred to the at least one second server among the one or more second servers or is made available for reference by the one or more second servers.

6. The data distribution method according to claim 1, wherein
one first server among the one or more first servers obtains a smart contract programmed to be able to determine, based on the consent information, whether the data is allowed to be provided, and
in response to obtaining the first transaction data, the one first server executes the smart contract based on the first transaction data obtained, and when the smart contract determines that the data is allowed to be provided from the one or more first servers to the one or more second servers, the one first server causes the one or more first servers to transfer the data pertaining to the apparatus held in the one or more first servers to at least one second server among the one or more second servers or to make the data pertaining to the apparatus held in the one or more first servers available for reference by the one or more second servers.

7. The data distribution method according to claim 1, comprising:
generating second transaction data for issuing a token to the apparatus, in response to confirming that the data pertaining to the apparatus has been transferred to the at least one second server among the one or more second servers or has been made available for reference by the one or more second servers; and
obtaining the second transaction data and issuing a token to the apparatus by the one first server.

8. The data distribution method according to claim 7, comprising:
obtaining, by the one first server, the second transaction data;
recording, by the one first server, a block including the second transaction data into the first distributed ledger; and
causing the one first server to execute a smart contract programmed to be able to issue the token based on the second transaction data recorded, and causing the smart contract to issue the token to the apparatus.

9. A non-transitory computer-readable recoding medium having recorded thereon a program for causing one or more computers to execute the data distribution method according to claim 1.

10. A data distribution system comprising:
one or more first servers each including a first distributed ledger; and
one or more second servers different from the one or more first servers, the one or more second servers each including a second distributed ledger different from the first distributed ledger, wherein
one first server among the one or more first servers obtains first transaction data that includes a data obtaining request indicating a request for obtaining or referring to data pertaining to an apparatus;
using consent information indicating that a user consents to utilization of the data pertaining to the apparatus, whether the one or more first servers are allowed to provide the data to the one or more second servers is determined, the consent information being recorded in the first distributed ledger; and
in response to determining that the data is allowed to be provided, the data pertaining to the apparatus held in the one or more first servers is transferred to at least one second server among the one or more second servers or is made available for reference by the one or more second servers.

* * * * *